US012784129B2

(12) United States Patent
Matsumoto et al.

(10) Patent No.: US 12,784,129 B2
(45) Date of Patent: Nov. 3, 2026

(54) IMAGE PROCESSING DEVICE AND IMAGE PROCESSING METHOD

(71) Applicant: Nuvoton Technology Corporation Japan, Kyoto (JP)

(72) Inventors: Jin Matsumoto, Osaka (JP); Katsumi Tokuyama, Osaka (JP); Kenji Watanabe, Kyoto (JP); Mutsumi Matsuura, Kyoto (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 222 days.

(21) Appl. No.: 18/913,501

(22) Filed: Oct. 11, 2024

(65) Prior Publication Data

US 2025/0037260 A1 Jan. 30, 2025

Related U.S. Application Data

(63) Continuation of application No. PCT/JP2023/018020, filed on May 12, 2023.

(30) Foreign Application Priority Data

May 20, 2022 (JP) ................................ 2022-083390

(51) Int. Cl.
*G06T 3/06* (2024.01)
*G06T 5/20* (2006.01)
(Continued)

(52) U.S. Cl.
CPC .................. *G06T 3/06* (2024.01); *G06T 5/20* (2013.01); *G06T 7/0002* (2013.01); *G06T 11/60* (2013.01)

(58) Field of Classification Search
CPC .......... G06T 3/06; G06T 5/20; G06T 7/0002; G06T 11/60; G06T 5/50;
(Continued)

(56) References Cited

FOREIGN PATENT DOCUMENTS

| | | | | |
|---|---|---|---|---|
| JP | 2002-190983 A | | 7/2002 |
| JP | 2015080152 A | * | 4/2015 |

OTHER PUBLICATIONS

International Search Report dated Jul. 18, 2023 issued in International Patent Application No. PCT/JP2023/018020, with English translation.

* cited by examiner

*Primary Examiner* — Matthew C Bella
*Assistant Examiner* — Shane Wrensford Codrington
(74) *Attorney, Agent, or Firm* — Rimon P.C.

(57) ABSTRACT

An image processing device includes signal processors, a second-control-signal generator that generates second control signals in accordance with first control signals generated by the signal processors, and an image synthesizer. Each signal processor includes a first digital processor for performing image adjustment and a second digital processor. The second digital processor includes a defect detector that detects a defective pixel and a defective pixel adaptation processor that generates, in accordance with the result of defective pixel detection, the first control signal specifying a synthesis coefficient to the second-control-signal generator. In accordance with synthesis coefficients indicated by the second control signals, the image synthesizer synthesizes images that have undergone the image adjustment by the first digital processors of the signal processors. When the defective pixel is detected, the defective pixel adaptation processor generates the first control signal for enabling the images to include an image in which the defective pixel remains.

8 Claims, 16 Drawing Sheets

(51) Int. Cl.
*G06T 7/00* (2017.01)
*G06T 11/60* (2026.01)

(58) Field of Classification Search
CPC .......... G06T 2207/10016; G06T 2207/30168; H04N 23/60; H04N 23/741; H04N 25/57
See application file for complete search history.

IMAGE PROCESSING DEVICE AND IMAGE PROCESSING METHOD

CROSS REFERENCE TO RELATED APPLICATIONS

This is a continuation application of PCT International Application No. PCT/JP2023/018020 filed on May 12, 2023, designating the United States of America, which is based on and claims priority of Japanese Patent Application No. 2022-083390 filed on May 20, 2022. The entire disclosures of the above-identified applications, including the specifications, drawings and claims are incorporated herein by reference in their entirety.

FIELD

The present disclosure relates to an image processing device and an image processing method.

BACKGROUND

As a method of expanding the dynamic range of a video signal, there is a known method of expanding a dynamic range by synthesizing images with different sensitivities. However, in synthesizing images, if a video signal includes a defect, there is a problem of not being able to correctly synthesize images due to the effects of the defect signal.

Patent Literature (PTL) 1 presents a method of synthesizing images using video signals in which defects have been corrected prior to synthesis by disposing processors for performing defect correction individually on respective frames with different sensitivities prior to the synthesis. In this case, it is possible to synthesize using the video signals without the defects, which makes it possible to synthesize correctly.

CITATION LIST

Patent Literature

PTL 1: Japanese Unexamined Patent Application Publication No. 2015-80152

SUMMARY

Technical Problem

However, in the method presented in PTL 1 described above, the processors for performing the defect correction individually on the respective frames are disposed, which increases the circuit size and power consumption.

In view of the above, the present disclosure provides, for example, an image processing device with reduced circuit size and power consumption that is capable of performing defect correction.

Solution to Problem

An image processing device according to the present disclosure includes: a plurality of signal processors that perform signal processing on a plurality of video signals; a second-control-signal generator that generates second control signals in accordance with first control signals generated by the plurality of signal processors; and an image synthesizer. Each of the plurality of signal processors includes a first digital processor for performing image adjustment and a second digital processor. The second digital processor includes: a defect detector that detects a defective pixel; and a defective pixel adaptation processor that generates, in accordance with the result of defective pixel detection, the first control signal specifying a synthesis coefficient to the second-control-signal generator. In accordance with synthesis coefficients indicated by the second control signals, the image synthesizer synthesizes a plurality of images that have undergone the image adjustment by the first digital processors of the plurality of signal processors, the synthesis coefficients each being the synthesis coefficient specified by the first control signal. When the defective pixel is detected, the plurality of images include an image in which the defective pixel remains.

An image processing method according to the present disclosure is an image processing method performed by an image processing device. The image processing method includes: performing signal processing on a plurality of video signals; generating second control signals in accordance with first control signals generated in the performing of the signal processing on the plurality of video signals; and synthesizing images. The performing of the signal processing on the plurality of video signals includes performing first digital processing for image adjustment and performing second digital processing. The performing of the second digital processing includes detecting a defective pixel in each of the plurality of video signals and generating, in accordance with the results of defective pixel detection, the first control signals specifying synthesis coefficients to be used in the generating of the second control signals. In the synthesizing, the images that have undergone the image adjustment in the performing of the first digital processing included in the performing of the signal processing on the plurality of video signals are synthesized in accordance with synthesis coefficients indicated by the second control signals, the synthesis coefficients being the synthesis coefficients specified by the first control signals. When a defective pixel is detected, the images to include an image in which the defective pixel remains.

It should be noted that these general or specific aspects may be embodied as a system, a method, an integrated circuit, a computer program, or a computer-readable recording medium such as a CD-ROM or may be embodied as any combination of the system, the method, the integrated circuit, the computer program, and the recording medium.

Advantageous Effects

By using, for example, an image processing device according to one aspect of the present disclosure, it is possible to perform defect correction while reducing the circuit size and power consumption.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
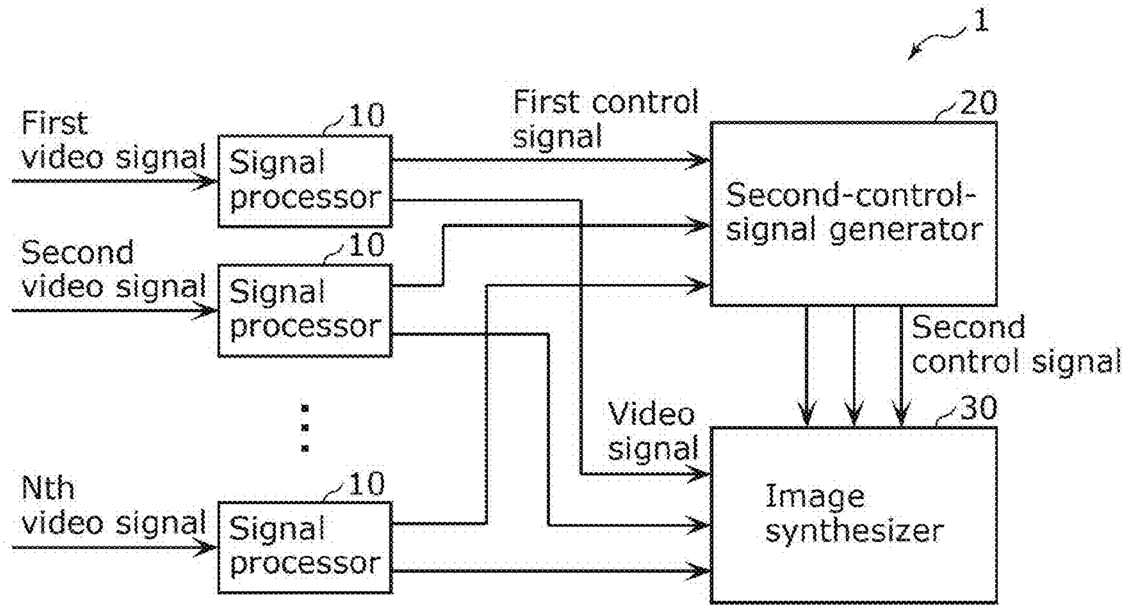
FIG. 1 is a block diagram illustrating a configuration example of an image processing device according to Embodiment 1.

An image processing device according to one aspect of the present disclosure includes: a plurality of signal processors that perform signal processing on a plurality of video signals; a second-control-signal generator that generates second control signals in accordance with first control signals generated by the plurality of signal processors; and an image synthesizer. Each of the plurality of signal processors includes a first digital processor for performing image adjustment and a second digital processor. The second digital processor includes: a defect detector that detects a defective pixel; and a defective pixel adaptation processor that generates, in accordance with the result of defective pixel detection, the first control signal specifying a synthesis coefficient to the second-control-signal generator. In accordance with synthesis coefficients indicated by the second control signals, the image synthesizer synthesizes a plurality of images that have undergone the image adjustment by the first digital processors of the plurality of signal processors, the synthesis coefficients each being the synthesis coefficient specified by the first control signal, and when the defective pixel is detected, the defective pixel adaptation processor generates the first control signal specifying, to the second-control-signal generator, a synthesis coefficient for enabling the plurality of images to include an image in which the defective pixel remains.

Thus, when a defective pixel is detected, the image in which the defective pixel remains is synthesized after the image adjustment. As such, processors for performing defect correction individually for the respective video signals are not disposed. For instance, just one processor for performing defect correction on one synthesized video signal is disposed, which can reduce the circuit size. As a result, power consumption can be reduced. Accordingly, by using the image processing device according to the present disclosure, it is possible to perform defect correction while reducing the circuit size and power consumption.

For instance, the plurality of video signals may be video signals with different sensitivities.

Thus, when synthesizing the plurality of video signals with the different sensitivities to expand the dynamic range, defect correction can be performed while reducing the circuit size and power consumption.

For instance, the second digital processor may include: a defect remover that removes the defective pixel; and a low-pass filter that performs flattening processing on a corresponding one of the plurality of video signals from which the defective pixel has been removed, and with respect to a pixel in which a defect has not been detected, the defective pixel adaptation processor may generate the first control signal by using the corresponding one of the plurality of video signals that has undergone the flattening processing performed after the removal of the defective pixel.

In image synthesis, a synthesized image may be degraded by a change in a signal for determining a synthesis coefficient due to the effects of noise or blurring. In response to this, it is possible to decrease a change in the synthesis coefficient by the flattening processing performed by the low-pass filter, which can mitigate the degradation of the synthesized image. However, when a defective pixel occurs in the video signal, the signal of the defective pixel may expand into its surrounding pixels due to the flattening processing performed by the low-pass filter, which may result in the degradation of the synthesized image rather than mitigating the degradation. As such, with regard to a pixel in which a defect has not been detected, a synthesis coefficient is determined using the video signal that has undergone the flattening processing after the removal of the defective pixel. Thus, even when a defective pixel occurs in the video signal, it is possible to mitigate the degradation of the synthesized image.

For instance, the plurality of video signals may include a first video signal and a second video signal with a sensitivity lower than the sensitivity of the first video signal, and when a defective pixel has been detected in the first video signal, the defective pixel adaptation processor of the signal processor that performs the signal processing on the first video signal among the plurality of signal processors may generate the first control signal specifying, as the synthesis coefficient of the first video signal, a synthesis coefficient higher than the synthesis coefficient of the second video signal to the second-control-signal generator. For instance, the first control signal specifying 100% as the synthesis coefficient of the first video signal may be generated.

A synthesized image may degrade when a defective pixel is synthesized with a pixel without a defect. Thus, when a defective pixel is detected in the first video signal, the synthesis coefficient of the first video signal increases (for example, to 100%), which can suppress the defective pixel and a pixel without a defect from being synthesized and thus mitigate the degradation of the synthesized image.

For instance, when a defective pixel has not been detected in the first video signal and the signal level of the first video signal is at least a predetermined level and at most a saturation level, the defective pixel adaptation processor of the signal processor that performs the signal processing on the first video signal may refer to the result of defective pixel detection in the second video signal, and when a defective pixel has been detected in the second video signal, the defective pixel adaptation processor may generate the first control signal specifying, as the synthesis coefficient of the second video signal, a synthesis coefficient higher than the synthesis coefficient of the first video signal. For instance, the first control signal specifying 100% as the synthesis coefficient of the second video signal may be generated.

When the signal level of the first video signal is at least the predetermined level and at most the saturation level, the first video signal and the second video signal are synthesized. At this time, even if a defective pixel has not been detected in the first video signal, when the second video signal includes a defective pixel, a synthesized image may degrade. For this reason, in this case, when a defective pixel is detected in the second video signal, the synthesis coefficient of the second video signal is increased (to, for example, 100%), which can suppress the defective pixel and a pixel without a defect from being synthesized and thus mitigate the degradation of the synthesized image.

For instance, each of the plurality of video signals may be a multiplexed signal obtained by multiplexing video signals with different sensitivities selected when pixels are output, and the defect detector may detect the defective pixel in accordance with a signal indicating the state of the multiplexed signal.

Thus, when synthesizing the plurality of multiplexed video signals with the different sensitivities to expand the dynamic range, it is possible to perform defect correction while reducing the circuit size and power consumption. In addition, the signal level of a defective pixel in a multiplexed signal changes to a great extent compared with adjacent pixels, and the state of the multiplexed signal changes. Thus, the defective pixel can be detected on the basis of the signal indicating the state of the multiplexed signal.

For instance, the plurality of video signals may include a main video signal and a sub-video signal, the main video signal may be a multiplexed signal obtained by multiplexing at least a first video signal and a second video signal with a sensitivity lower than the sensitivity of the first video signal, when the main video signal is the first video signal, the sub-video signal may be the second video signal with the sensitivity lower than the sensitivity of the first video signal, when a defective pixel has been detected in the first video signal in the main video signal, the defective pixel adaptation processor of the signal processor that performs the signal processing on the main video signal among the plurality of signal processors may generate the first control signal specifying, as the synthesis coefficient of the first video signal in the main video signal, a synthesis coefficient higher than the synthesis coefficient of the second video signal to the second-control-signal generator. For instance, the first control signal specifying 100% as the synthesis coefficient of the first video signal in the main video signal may be generated.

A synthesized image may degrade when a defective pixel is synthesized with a pixel without a defect. Thus, when a defective pixel is detected in the first video signal in the main video signal, the synthesis coefficient of the first video signal increases (for example, to 100%), which can suppress the defective pixel and a pixel without a defect from being synthesized and thus mitigate the degradation of the synthesized image.

An image processing method according to another aspect of the present disclosure is an image processing method performed by an image processing device. The image processing method includes: performing signal processing on a plurality of video signals; generating second control signals in accordance with first control signals generated in the performing of the signal processing on the plurality of video signals; and synthesizing images. The performing of the signal processing on the plurality of video signals includes performing first digital processing for image adjustment and performing second digital processing. The performing of the second digital processing includes detecting a defective pixel in each of the plurality of video signals and generating, in accordance with the results of defective pixel detection, the first control signals specifying synthesis coefficients to be used in the generating of the second control signals. In the synthesizing, the images that have undergone the image adjustment in the performing of the first digital processing included in the performing of the signal processing on the plurality of video signals are synthesized in accordance with synthesis coefficients indicated by the second control signals, the synthesis coefficients being the synthesis coefficients specified by the first control signals. In the generating of the first control signals, when a defective pixel is detected, a first control signal specifying a synthesis coefficient for enabling the images to include an image in which the defective pixel remains is generated, the synthesis coefficient being used in the generating of the second control signals.

Thus, it is possible to provide the image processing method capable of performing defect correction while reducing the circuit size and power consumption.

Embodiments are described below in detail with reference to the drawings.

It should be noted that the embodiments described below each indicate a comprehensive or specific example. The numerical values, shapes, materials, constituent elements, arrangement and connection of the constituent elements, steps, order of steps, and other details indicated in the embodiments described below are merely examples, and do not intend to limit the present disclosure.

Embodiment 1

First, a configuration example of an image processing device according to Embodiment 1 is described with reference to FIG. 1.

FIG. 1 is a block diagram illustrating a configuration example of image processing device 1 according to Embodiment 1.

In Embodiment 1, a configuration example related to a circuit that synthesizes images through image processing for a plurality of (two or more) video signals with different sensitivities is described in detail.

As illustrated in FIG. 1, image processing device 1 includes signal processors 10, second-control-signal generator 20, and image synthesizer 30. Here, second-control-signal generator 20 generates a second control signal in accordance with first control signals generated by signal processors 10. Image synthesizer 30 synthesizes the images that have undergone signal processing in accordance with synthesis coefficients indicated by the second control signal. It should be noted that a defect correction circuit is not disposed in any of signal processors 10.

The constituent elements of image processing device 1 can be achieved as, for example, a processor that executes a program stored in memory.

Signal processors 10 perform the signal processing on a plurality of video signals. For instance, as illustrated in FIG.

1, signal processors 10 are provided in one-to-one correspondence to the first video signal to the nth video signal (where n is an integer greater than or equal to 2). In Embodiment 1, the plurality of video signals (the first video signal to the nth video signal) are video signals with different sensitivities. Here, details of signal processors 10 are described with reference to FIG. 2.

Figure 2:
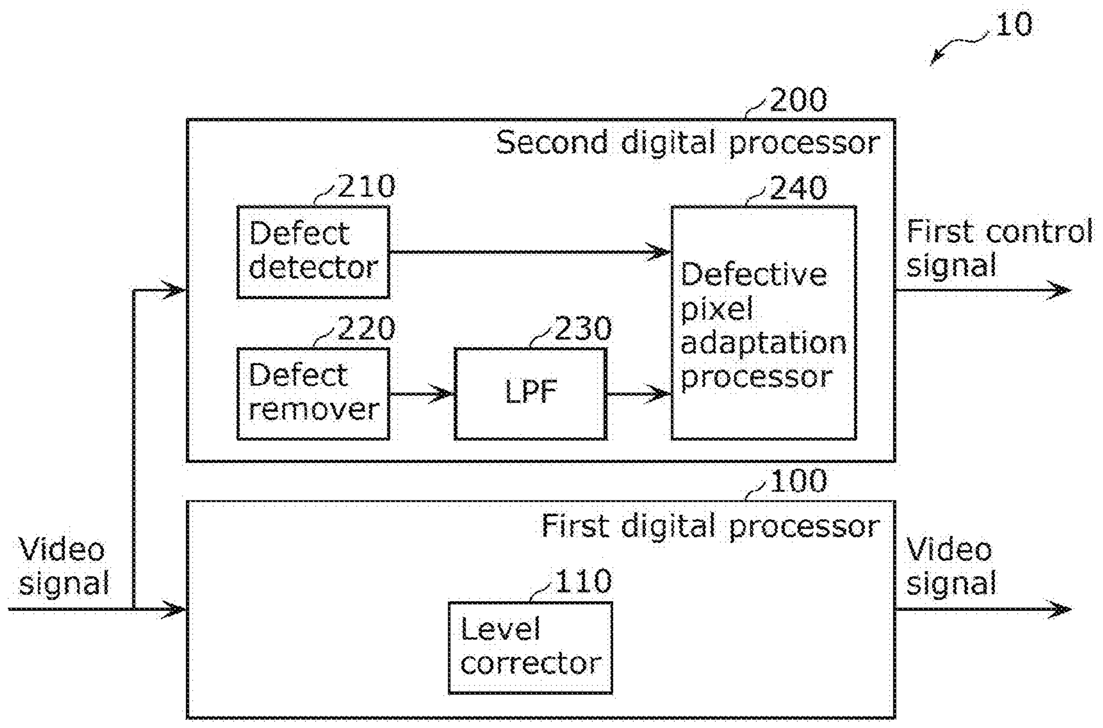
FIG. 2 illustrates a configuration example of a signal processor according to Embodiment 1.

FIG. 2 illustrates a configuration example of signal processor 10 according to Embodiment 1.

As illustrated in FIG. 2, signal processor 10 includes first digital processor 100 and second digital processor 200. First digital processor 100 aims to process a video signal in order to synthesize video signals, whereas second digital processor 200 aims to perform processing for controlling a synthesis condition.

First digital processor 100 includes level corrector 110 for adjusting the level of the video signal as image adjustment.

In image synthesis, a change in a signal for determining a synthesis condition due to the effects of noise or blurring may change the synthesis condition, which may degrade a synthesized image. For instance, in Japanese Unexamined Patent Application Publication No. 2002-190983, with regard to a part that calculates a coefficient regarding synthesis, a configuration is presented in which low-pass filter processing is performed in order to suppress a frequency change prior to calculation of the coefficient. There is the effect of reducing a frequency change because of the effects of flattering by a low-pass filter, which can mitigate the degradation of the synthesized image. However, when a defect occurs in a video signal, the defect signal may expand into surrounding pixels through the processing by the low-pass filter, which may result in the degradation of the synthesized image rather than mitigating the degradation.

By contrast, in the present disclosure, the above issue can be addressed using second digital processor 200.

Second digital processor 200 includes defect detector 210, defect remover 220, low-pass filter (LPF) 230, and defective pixel adaptation processor 240. Here, defect detector 210 detects a defective pixel. Defect remover 220 removes the defective pixel. Low-pass filter 230 performs flattening processing on a video signal from which the defective pixel has been removed. Defective pixel adaptation processor 240 performs adaptation processing. Using defective pixel adaptation processor 240, second digital processor 200 performs the adaptation processing in accordance with the result of defective pixel detection by defect detector 210 and the video signal that has undergone the flattening processing by low-pass filter 230 after defect removal by defect remover 220. Then, as the result of the adaptation processing, second digital processor 200 outputs the first control signal to second-control-signal generator 20.

By referring to the results of the adaptation processing performed in accordance with the results of defective pixel detection (in other words, by referring to the first control signals), second-control-signal generator 20 generates the second control signal for image synthesis and outputs the second control signal to image synthesizer 30.

In accordance with the synthesis coefficients indicated by the second control signal, image synthesizer 30 synthesizes the plurality of images that have undergone the image adjustment by first digital processors 100 of signal processors 10. It should be noted that when a defective pixel is detected, the plurality of images include an image in which the defective pixel remains. In other words, when a defective pixel is detected, defective pixel adaptation processor 240 generates the first control signal specifying, to second-control-signal generator 20, a synthesis coefficient for enabling the plurality of images to include an image in which the defective pixel remains. In this way, image synthesizer 30 can synthesize the image in which the defective pixel remains under the optimal condition.

The plurality of video signals with the different sensitivities are individually output and each input into a corresponding one of signal processors 10. In the example described here, the plurality of video signals include the first video signal and the second video signal with a sensitivity lower than the sensitivity of the first video signal. Specifically, two 10-bit video signals with a sensitivity ratio of 4 to 1, the first video signal and the second video signal are used as an example.

Figure 3:
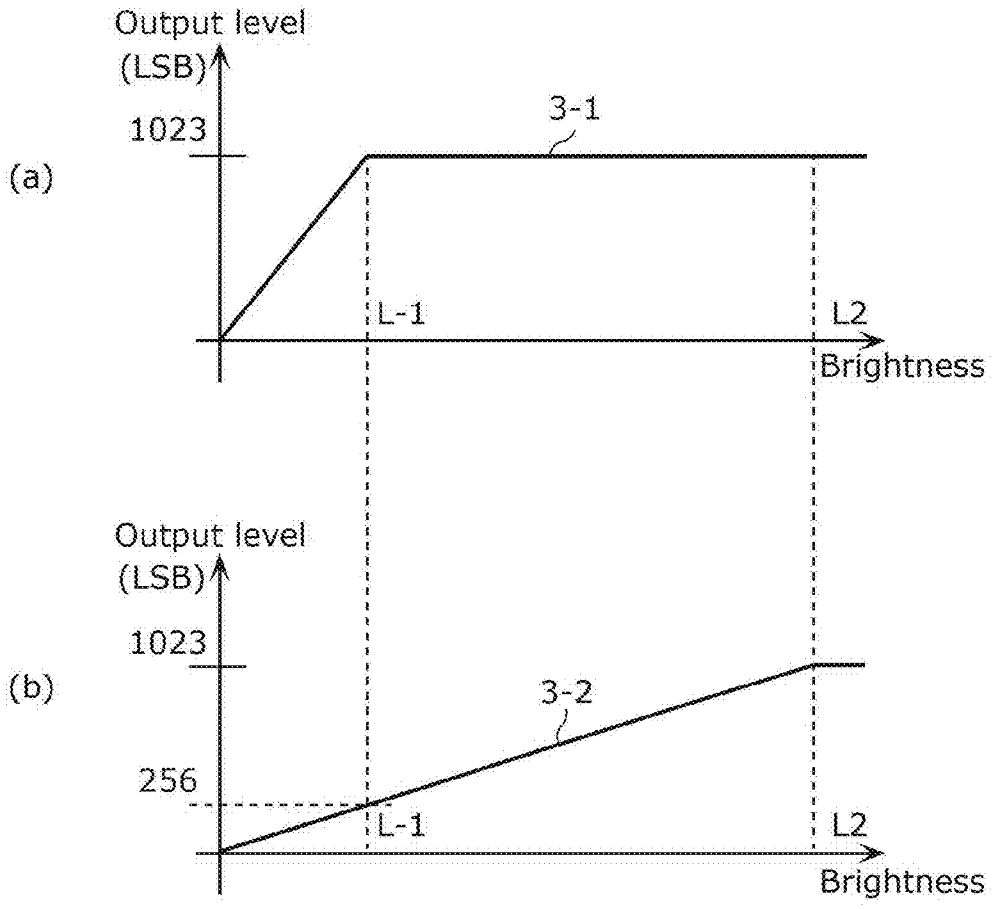
FIG. 3 illustrates the first video signal and the second video signal according to Embodiment 1.

FIG. 3 illustrates the first video signal and the second video signal according to Embodiment 1. (a) in FIG. 3 illustrates the first video signal, and (b) in FIG. 3 illustrates the second video signal. The output characteristics of the first video signal are indicated by 3-1 in (a) in FIG. 3, and the output characteristics of the second video signal are indicated by 3-2 in (b) in FIG. 3.

Since the first video signal (3-1) and the second video signal (3-2) have different sensitivities, the signal levels of the video signals are different. At the brightness where the signal level of the first video signal reaches 1023 LSB and becomes saturated, the signal level of the second video signal reaches 256 LSB, which is a quarter of the signal level of the first video signal. When the second video signal becomes four times brighter, the signal level of the second video signal reaches 1023 LSB and becomes saturated.

The first video signal (3-1) is input into signal processor 10 corresponding to the first video signal, and the second video signal (3-2) is input into signal processor 10 corresponding to the second video signal. In each of signal processors 10, first digital processor 100 adjusts the level of the corresponding video signal and outputs, to image synthesizer 30, the video signal that has undergone the level adjustment. Second-control-signal generator 20 generates a synthesis condition as the second control signal. Image synthesizer 30 synthesizes images in accordance with the generated second control signal.

Figure 4:
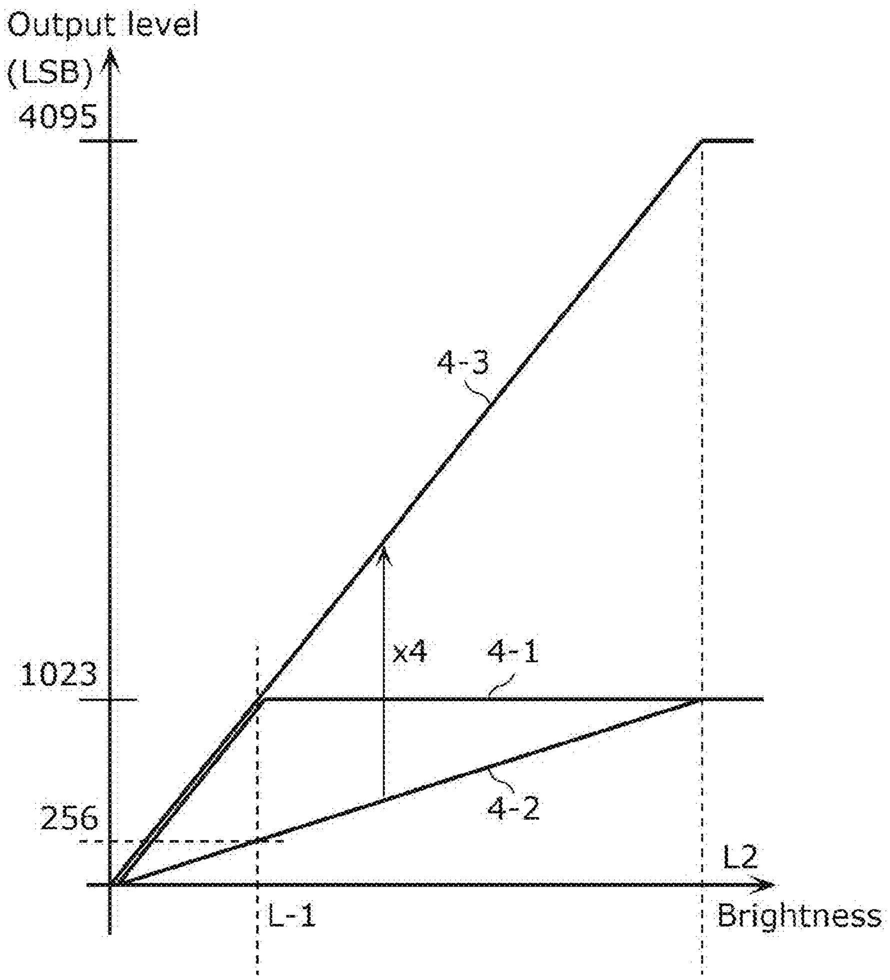
FIG. 4 illustrates a relationship between the first video signal and the second video signal according to Embodiment 1.
Figure 5:
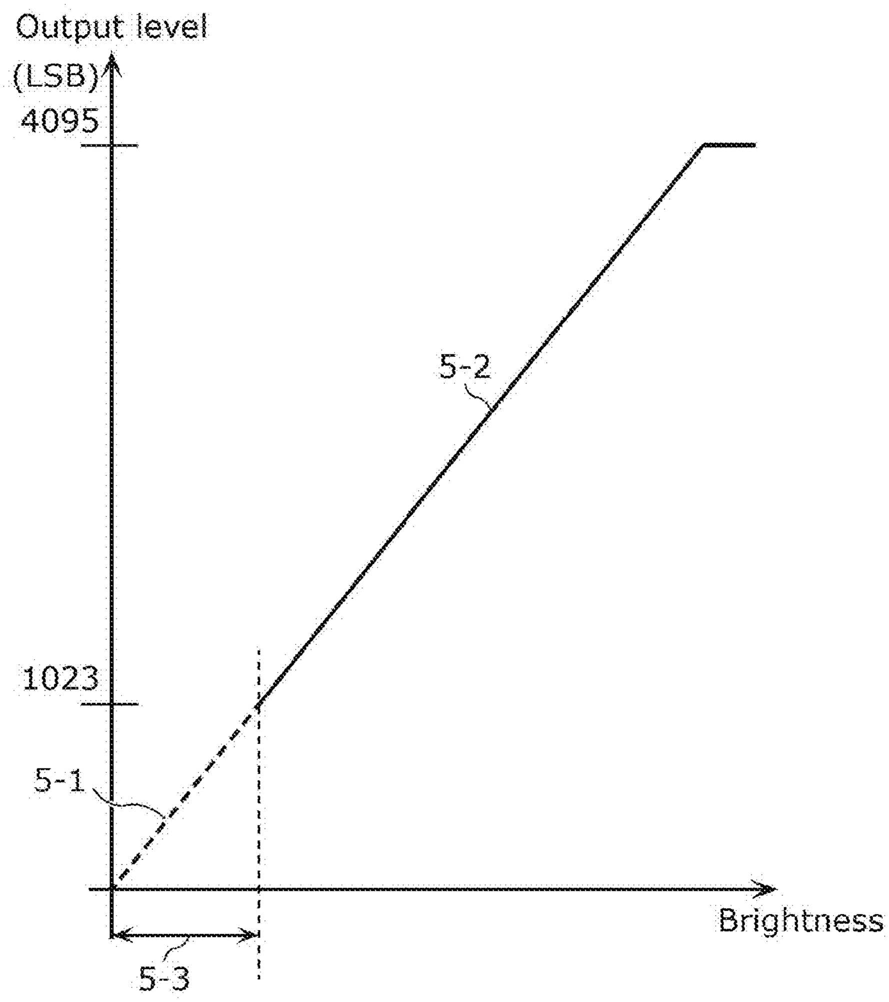
FIG. 5 illustrates a synthesized signal according to Embodiment 1.
Figure 6:
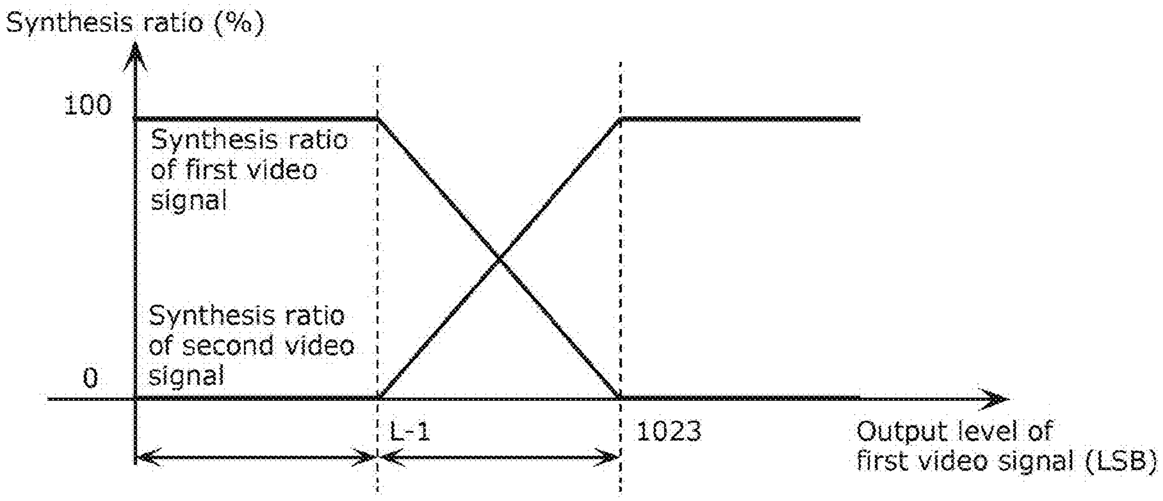
FIG. 6 is a figure for explaining synthesis coefficients according to Embodiment 1.

Here, explanations regarding image synthesis are provided with reference to FIGS. 4 to 6.

FIG. 4 illustrates a relationship between the first video signal and the second video signal according to Embodiment 1. The output characteristics of the first video signal are indicated by 4-1, the output characteristics of the second video signal are indicated by 4-2, and the output characteristics of the quadrupled second video signal are indicated by 4-3.

FIG. 5 illustrates a synthesized signal according to Embodiment 1. The portion of the synthesized signal where the first video signal is used is indicated by 5-1, and the portion of the synthesized signal where the second video signal is used is indicated by 5-2.

FIG. 6 is a figure for explaining synthesis coefficients according to Embodiment 1.

As illustrated in FIG. 4, the first video signal (4-1) is a 10-bit signal, and at a brightness of L-1 or brighter, the first video signal is saturated and clipped at 1023 LSB, which means that the first video signal cannot represent a brightness of L-1 or brighter. Meanwhile, at a brightness of L-1, the data amount of the second video signal (4-2) is a quarter of that of the first video signal (4-1). Specifically, the signal level of the second video signal reaches 256 LSB, and the second video signal can represent a brightness of L-1 or brighter. Since the signal level of the second video signal (4-2) is a quarter of that of the first video signal (4-1), a onefold level adjustment is performed on the first video signal (4-1), and a fourfold level adjustment is performed on the second video signal (4-2). The quadrupled second video signal (4-3) becomes a 12-bit signal that can represent up to 4095 LSB. However, since the second video signal (4-3) is a signal generated by quadrupling the second video signal (4-2) having a low signal level which is a quarter of the signal level of the first video signal (4-1), the second video signal (4-3) tends to have a poor signal-to-noise-ratio (S/N). Thus, as illustrated in FIG. 5, in synthesizing signals, in the brightness range indicated by 5-3, with low signal levels up to 1023 LSB, the first video signal (5-1) with a good S/N is used, and the second video signal (5-2) is used as the signal of signal levels higher than or equal to 1023 LSB at which the first video signal (5-1) becomes saturated. In this way, a synthesized video signal with a wide dynamic range can be generated.

At this time, switching to the second video signal occurs at the level at which the first video signal becomes saturated. If there is an error between the signal level of the first video signal and the signal level of the second video signal that has undergone the level correction, a difference in the signal level occurs. In addition, even if the signal level of the first video signal is equivalent to that of the second video signal that has undergone the level correction, the second video signal with the quadrupled signal level has a poor S/N. Thus, a difference in the S/N also occurs in a switching boundary portion. For this reason, an image tends to be an unnatural image.

To reduce the unnaturalness due to the signal level difference and the S/N difference, as illustrated in FIG. 6, the synthesis ratio of the first video signal to the second video signal gradually changes from a given signal level of the first video signal (for example, the level corresponding to a brightness of L-1). Specifically, control is performed in which the synthesis ratio of the second video signal is gradually increased and switching to the 100% second video signal occurs at 1023 LSB, which is the saturation signal level. Gradually changing the synthesis coefficients can flatten the amount of change in the signal level difference and the amount of change in the S/N difference, which can reduce the unnaturalness due to the differences.

The synthesis processing is performed as below in the configuration illustrated in FIG. 2. The level adjustment is performed on each of the first video signal and the second video signal to be synthesized, by level corrector 110 of corresponding first digital processor 100. The first video signal that has undergone the onefold level adjustment and the second video signal that has undergone the fourfold level adjustment are input into image synthesizer 30. By referring to the first control signals, second-control-signal generator 20 generates, as the second control signal, a synthesis condition in the synthesis processing by image synthesizer 30, and inputs the second control signal into image synthesizer 30. In accordance with the second control signal indicating the synthesis condition and input from second-control-signal generator 20, image synthesizer 30 synthesizes the first video signal that has undergone the onefold level adjustment and the second video signal that has undergone the fourfold level adjustment.

Here, an instance in which a defect (a defective pixel) has occurred in the first video signal is considered. When a defect occurs in the first video signal, since level determination for calculating the synthesis coefficients illustrated in FIG. 6 cannot be correctly performed, it is not possible to correctly generate the synthesis condition (the second control signal). As a result, a degradation phenomenon in a synthesized image is generated. As image degradation phenomena, partial S/N degradation, a level change in the defect signal, and expansion of a defect into the surrounding pixels are considered.

In Embodiment 1, second digital processor 200 detects a defective pixel, removes the defective pixel, and performs calculation of the adaptation processing for the defective pixel. Then, the synthesis coefficients indicated by the second control signal generated by second-control-signal generator 20 are controlled in accordance with the results of the adaptation processing. In this way, even if a defect has occurred, image synthesis is performed without being affected by the defect. Even if a defect has occurred, a synthesized image is generated in which the defect remains the same and partial S/N degradation and the expansion of the defect into the surrounding pixels are suppressed. In this case, an optimal image can be generated by performing proper defect correction with the use of, for example, a defect correction circuit, which is a subsequent circuit. Operation of image processing device 1 is described below in detail.

Defect detector 210 performs defective pixel detection on the first video signal input into second digital processor 200.

Figure 7:
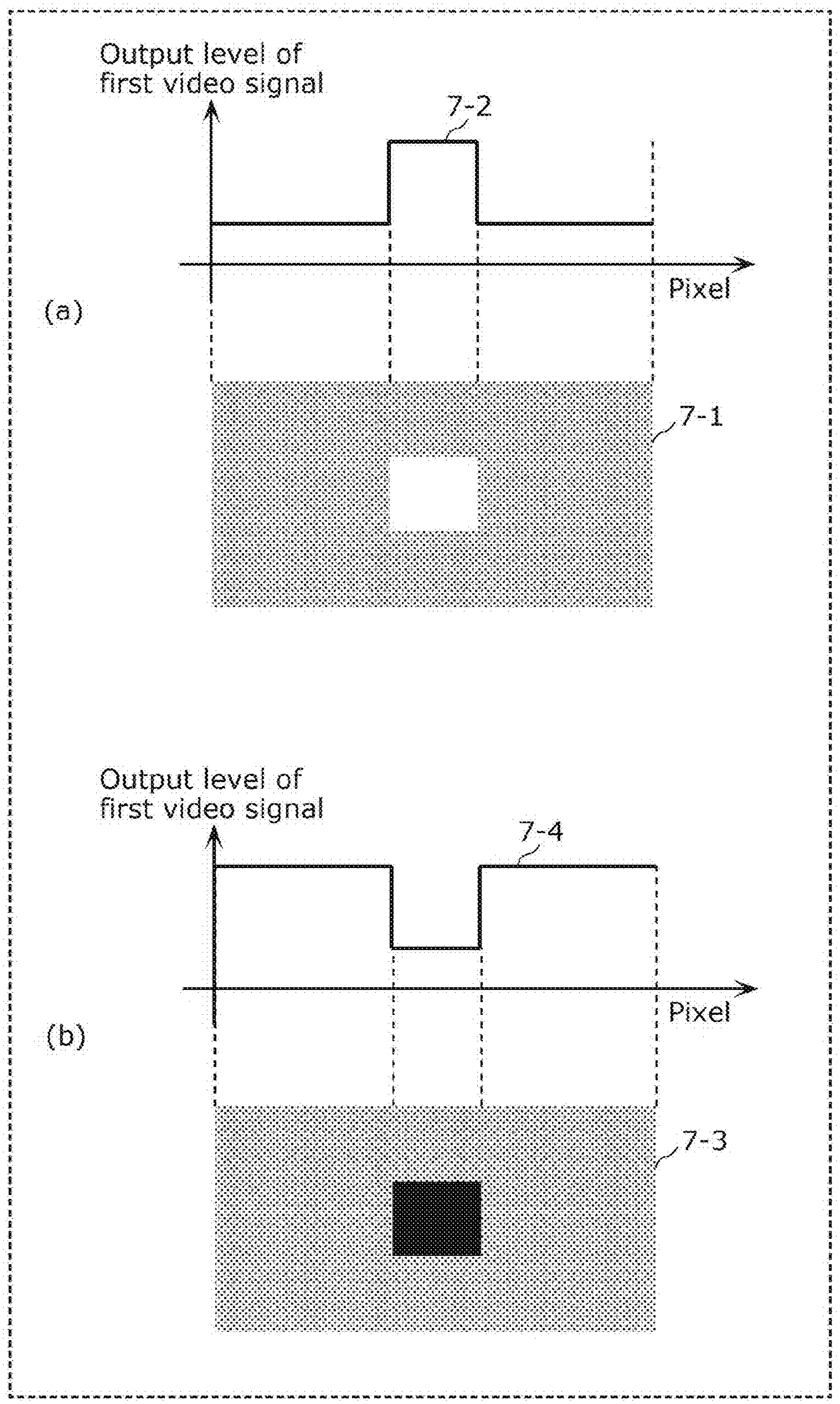
FIG. 7 illustrates relationships between a defective pixel and a video signal level according to Embodiment 1.

FIG. 7 illustrates relationships between a defective pixel and the video signal level according to Embodiment 1. (a) in FIG. 7 illustrates an instance of a white defect, and (b) in FIG. 7 illustrates an instance of a black defect.

Defects include a white defect in an image with only the defective pixel appearing as blown-out highlights (clipped whites), as indicated by 7-1 in (a) in FIG. 7 and a black defect in an image with only the defective pixel appearing as blocked-up shadows (clipped blacks), as indicated by 7-3 in (b) in FIG. 7. A video signal has redundancy, and the amount of change in contiguous data is small. Thus, if the video signal includes a defect, the feature that data changes to a great extent only for one pixel appears. The white-defect video signal has a bright signal level only for the one pixel, as indicated by 7-2. The black-defect video signal has a dark signal level only for the one pixel, as indicated by 7-4. Defect remover 220 removes the defective pixels by using the above features.

Figure 8:
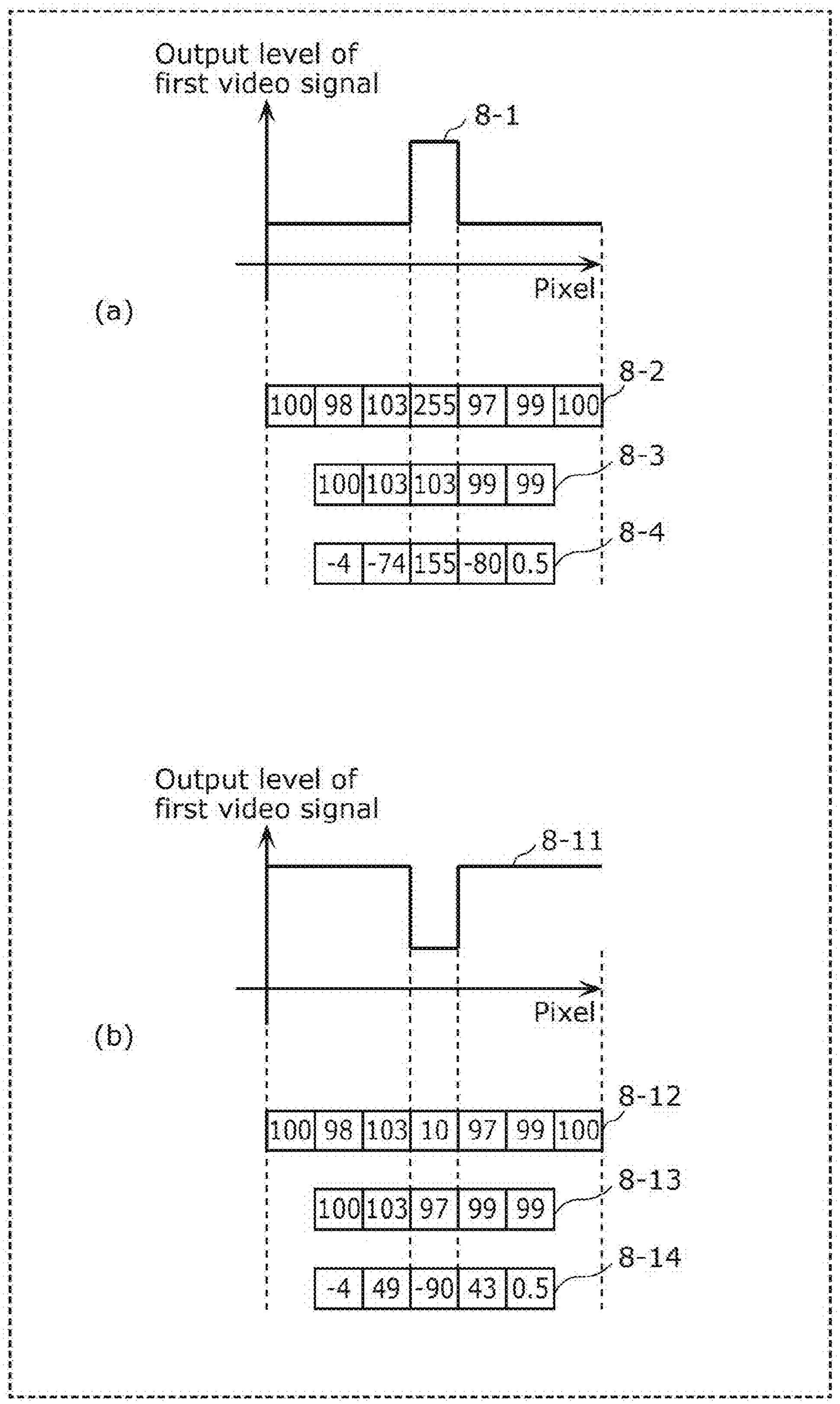
FIG. 8 is a figure for explaining defective pixel detection and defective pixel removal according to Embodiment 1.

FIG. 8 is a figure for explaining defective pixel detection and defective pixel removal according to Embodiment 1. (a) in FIG. 8 illustrates an instance of a white defect, and (b) in FIG. 8 illustrates an instance of a black defect.

For example, for a white defect as indicated by 8-1 in (a) in FIG. 8, the video signal is indicated by an extremely large value only for the white defect as indicated by 8-2. Median filtering processing for n pixels in a horizontal direction is performed on the signal. For instance, when the median filtering processing for three pixels is performed, the data indicated by 8-3 is obtained, and white-defect data is removed. For a black defect as indicated by 8-11, the video signal is indicated by an extremely small value only for the black defect as indicated by 8-12. When the median filtering processing for three pixels in the horizontal direction is performed on the signal in the same manner as above, the data indicated by 8-13 is obtained, and black-defect data is removed. Here, the examples in which a median filter for the n pixels is used as a method of removing a defective pixel are described. However, as long as a removing method using the characteristics of a defect is used, defect removal may be achieved by using a different method.

Defect detector 210 detects a defective pixel. Specifically, defect detector 210 compares the signal level of an attention pixel with the signal levels of its surrounding pixels. For instance, when a difference between an attention pixel difference and the average value of the two adjacent pixels is calculated, the difference calculation results show a large value in the positive direction only for the defective pixel as indicated by 8-4. When the signal level of the difference for determining the pixel as a defective pixel is set to 60 LSB, if a difference calculation result indicates 60 LSB or higher, the pixel can be determined as a defective pixel. In addition, defect detector 210 compares the signal level of an attention pixel and the signal levels of the surrounding pixels also with respect to the black defect in the same manner. For instance, when a difference between an attention pixel difference and the average value of the two adjacent pixels is calculated, the difference calculation results show a large value in the negative direction only for the defective pixel as indicated by 8-14. When the signal level of the difference for determining the pixel as a defective pixel is set to minus 60 LSB, if a difference result indicates minus 60 LSB or less, the pixel can be determined as a defective pixel. Here, the examples in which the difference from the surrounding pixels is used as a defective pixel detection method are described. However, as long as a detection method using the characteristics of a defect is used, detection may be performed by using a different method.

Next, low-pass filter 230 is described.

Normally, a noise component is superimposed on a video signal. Thus, variations in data are caused due to the effects of noise. Variations tend to occur in the first control signal when defective pixel adaptation processor 240 generates, using only one pixel, the first control signal to be used in determining a synthesis condition in second-control-signal generator 20. On that account, to flatten the noise component by using low-pass filter 230 is an effective way of stabilizing the synthesis condition. However, when the video signal includes a defect, the defective pixel affects the result of processing by low-pass filter 230 not only when an attention pixel includes a defect, but also when a surrounding pixel includes a defect. As a result, an error occurs in the first control signal. If second-control-signal generator 20 uses the first control signal in which the error has occurred, it is not possible to calculate a correct synthesis condition (the second control signal). As a result, the degradation of a synthesized signal occurs with the effects of the defective pixel being expanded into the surrounding pixels.

Defect remover 220 is provided to deal with such an issue, and by removing a defective pixel from a video signal input into low-pass filter 230, there is the effect of mitigating the degradation of the image quality due to the expansion of a defect into the surrounding pixels. Even if the video signal includes a defect, by inputting, into low-pass filter 230, the video signal that has undergone the median filtering processing by defect remover 220, low-pass filter 230 can perform the flattening processing on the video signal without a defect signal. This can avoid the expansion of the effects of the defective pixel into the surrounding pixels, which makes it possible to mitigate the degradation of a synthesized signal.

Thus, with respect to the pixel in which a defect has not been detected, defective pixel adaptation processor 240 generates the first control signal using the video signal that has undergone the flattening processing after the removal of the defective pixel.

Then, defective pixel adaptation processor 240 is described.

Defective pixel adaptation processor 240 receives a defect signal including the defect detected by defect detector 210 and the video signal, not including a defect signal, that has undergone the flattening processing, the video signal being obtained through the processing by defect remover 220 and the processing by low-pass filter 230. The adaptation processing is performed on the pixel in which a defect has been detected. Here, the adaptation processing is described with reference to FIG. 9.

Figure 9:
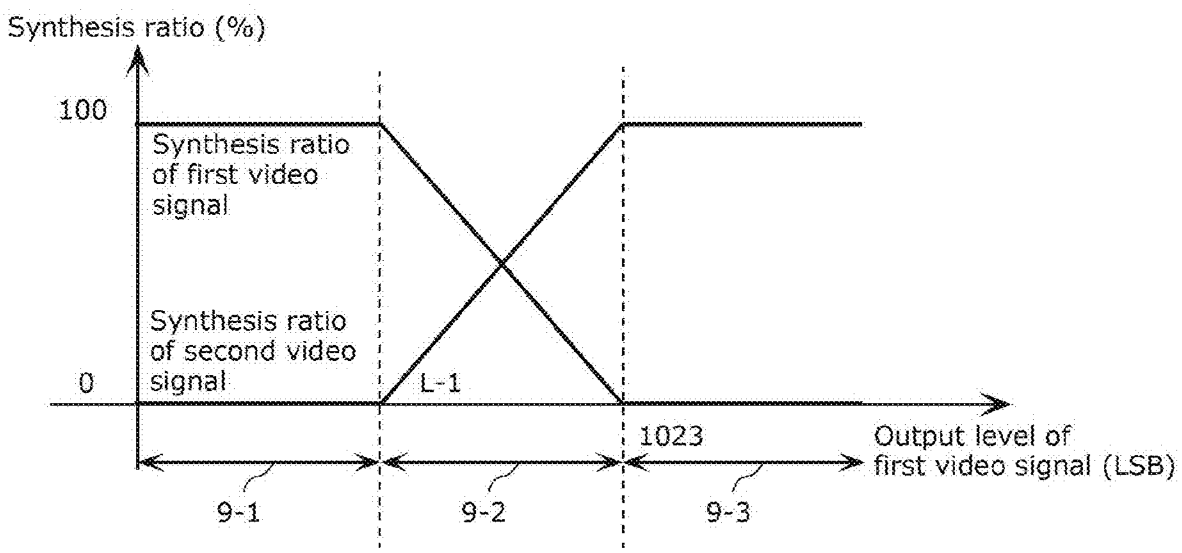
FIG. 9 is a figure for explaining defect adaptation control according to Embodiment 1.

FIG. 9 is a figure for explaining defect adaptation control according to Embodiment 1.

First, an instance where a white defect has occurred is considered. Here, since the result of image synthesis changes depending on the signal level of the defect, an explanation is given using the synthesis coefficients for use in synthesizing the first video signal and the second video signal illustrated in FIG. 9.

Range 9-1 is a range where the usage percentage of the first video signal is 100%. Range 9-2 is a range where the first video signal and the second video signal multiplied by respective synthesis coefficients are synthesized. Range 9-3 is a range where the usage percentage of the second video signal is 100%. When the signal level of the first video signal is less than a brightness of L-1, the synthesis coefficients in range 9-1 are used. When the signal level of the first video signal is at least a brightness of L-1 and less than a saturation level, the synthesis coefficients in range 9-2 are used. When the signal level of the first video signal becomes saturated, the synthesis coefficients in range 9-3 are used.

When a white defect has occurred in the first video signal and the signal level of the white defect is the saturation level, the video signal that would not have been saturated if the white defect had not occurred is determined as a saturation signal due to the effects of the white defect. Thus, the state is falsely recognized as a state in which the synthesis coefficients in range 9-3 are expected to be used (that is, the state in which the usage percentage of the second video signal is expected to be 100%), and the second video signal will be used with a usage percentage of 100%. At this time, when the actual signal level of the video signal is the level corresponding to the brightness of range 9-1, the signal level of the second video signal is low, which means that the second video signal has a poor S/N. Thus, the signal with the poor S/N will be used with a usage percentage of 100%. Thus, a synthesized image with a partially poor S/N is generated due to the synthesized signal.

In addition, when the signal level of the white defect is at least the level corresponding to a brightness of L-1 illustrated in FIG. 9 and at most the saturation level illustrated in FIG. 9, the state is falsely recognized as a state in which the synthesis coefficients in range 9-2 are expected to be used. Thus, the defect signal of the first video signal and the second video signal are synthesized at a certain ratio. As a result, an image obtained through synthesis is a synthesized image using the defect signal multiplied by a certain synthesis coefficient. Thus, the signal level of the synthesized signal changes to the signal level affected by the defect, and a correct synthesized signal cannot be obtained.

To avoid synthesis based on the false recognition, when defect detector 210 detects a defective pixel, defective pixel adaptation processor 240 transmits the first control signal to second-control-signal generator 20 in order to adaptively unconditionally change the synthesis coefficients to the synthesis coefficients in range 9-1, thereby changing the synthesis coefficients.

Normal processing using the video signal that has undergone the flattening processing is performed on a pixel in which defect detector 210 has not detected a defect. It should be noted that when the signal level of the first video signal is at least the level corresponding to a brightness of L-1 and at most the saturation level, the first video signal and the second video signal are synthesized at a certain synthesis ratio. However, if a defect has occurred in the second video signal, the signals will be synthesized using the defect signal. Thus, in this case, the result of defective pixel detection in the second video signal is referenced, and if a defect has occurred, the second video signal will be used with a usage percentage of 100%.

Next, an instance where a black defect has occurred is considered.

If a black defect of a level less than or equal to the level corresponding to a brightness of L-1 has occurred in the first video signal, even when the signal level of the video signal in which a black defect has not occurred is in any of ranges 9-1, 9-2, and 9-3, the state is determined as a state in which the synthesis coefficients in range 9-1 are expected to be used. In this case, as a result, the 100% first video signal is output in its original state, and the signal with the black defect is output in its original state. Thus, the signal level of the signal with the black defect will not change. However, if a black defect of a level greater than or equal to the level corresponding to a brightness of L-1 has occurred in the first video signal, the state is falsely recognized as a state in which the synthesis coefficients in range 9-2 are expected to be used. Thus, as in the case of the white defect, the defect signal of the first video signal and the second video signal are synthesized at a certain ratio. As a result, an image obtained through synthesis is a synthesized image using the defect signal multiplied by a certain synthesis coefficient. Thus, the signal level of the synthesized signal changes to the signal level affected by the defect, and a correct synthesized signal cannot be obtained.

To avoid synthesis based on the false recognition, as in the case of the white defect, defective pixel adaptation processor 240 transmits the first control signal to second-control-signal generator 20 in order to adaptively unconditionally change the synthesis coefficients to the synthesis coefficients in range 9-1, thereby changing the synthesis coefficients.

In this way, when a defective pixel is detected in the first video signal, defective pixel adaptation processor 240 of signal processor 10 that performs the signal processing on the first video signal generates the first control signal specifying, as the synthesis coefficient of the first video signal, a synthesis coefficient higher than the synthesis coefficient of the second video signal to second-control-signal generator 20. For instance, defective pixel adaptation processor 240 can mitigate the degradation of a synthesized image by generating the first control signal specifying 75% or higher as the synthesis coefficient of the first video signal. For instance, defective pixel adaptation processor 240 can sufficiently mitigate the degradation of a synthesized image by generating the first control signal specifying 90% or higher as the synthesis coefficient of the first video signal. For instance, defective pixel adaptation processor 240 can further mitigate the degradation of a synthesized image by generating the first control signal specifying 100% as the synthesis coefficient of the first video signal.

When a defective pixel has not been detected in the first video signal, defective pixel adaptation processor 240 calculates the synthesis ratio of the first video signal to the second video signal as illustrated in FIG. 9 according to the level of the first video signal, generates the first control signal specifying the calculated synthesis ratio, and outputs the first control signal to second-control-signal generator 20. Meanwhile, when receiving the first control signal specifying 100% as the synthesis coefficient of the first video signal from defective pixel adaptation processor 240, second-control-signal generator 20 generates the second control signal for unconditionally changing the synthesis coefficient of the first video signal to 100%.

In addition, when a defective pixel has not been detected in the first video signal and the signal level of the first video signal is at least a predetermined level (specifically, the level corresponding to a brightness of L-1) and at most the saturation level, defective pixel adaptation processor 240 of signal processor 10 that performs the signal processing on the first video signal refers to the result of defective pixel detection in the second video signal. When a defective pixel has been detected in the second video signal, defective pixel adaptation processor 240 generates the first control signal specifying, as the synthesis coefficient of the second video signal, a synthesis coefficient higher than that of the first video signal to second-control-signal generator 20. For instance, defective pixel adaptation processor 240 can mitigate the degradation of a synthesized image by generating the first control signal specifying 75% or higher as the synthesis coefficient of the second video signal. For instance, defective pixel adaptation processor 240 can sufficiently mitigate the degradation of a synthesized image by generating the first control signal specifying 90% or higher as the synthesis coefficient of the second video signal. For instance, defective pixel adaptation processor 240 can further mitigate the degradation of a synthesized image by generating the first control signal specifying 100% as the synthesis coefficient of the second video signal.

Second-control-signal generator 20 generates the second control signal in accordance with the synthesis coefficient specified by the first control signal generated in the processing by defective pixel adaptation processor 240, and outputs the second control signal to image synthesizer 30. Image synthesizer 30 can generate a synthesized signal that is not affected by the defect, by synthesizing, in accordance with the synthesis ratio indicated by the second control signal, the first video signal and the second video signal that has undergone the level adjustment. It should be noted that defect correction can be performed without any problems on the synthesized signal generated by image synthesizer 30 in the subsequent processing.

In the above configuration, defect detector 210 can be configured as a median filter for n pixels, and defect remover 220 can be configured as a comparator circuit. This can reduce the circuit size, compared with the configuration in which each of signal processors 10 includes a circuit for performing defective pixel correction by complementing a pixel using its surrounding pixels.

Embodiment 2

Next, Embodiment 2 is described.

First, a configuration example of an image processing device according to Embodiment 2 is described with reference to FIG. 10.

Figure 10:
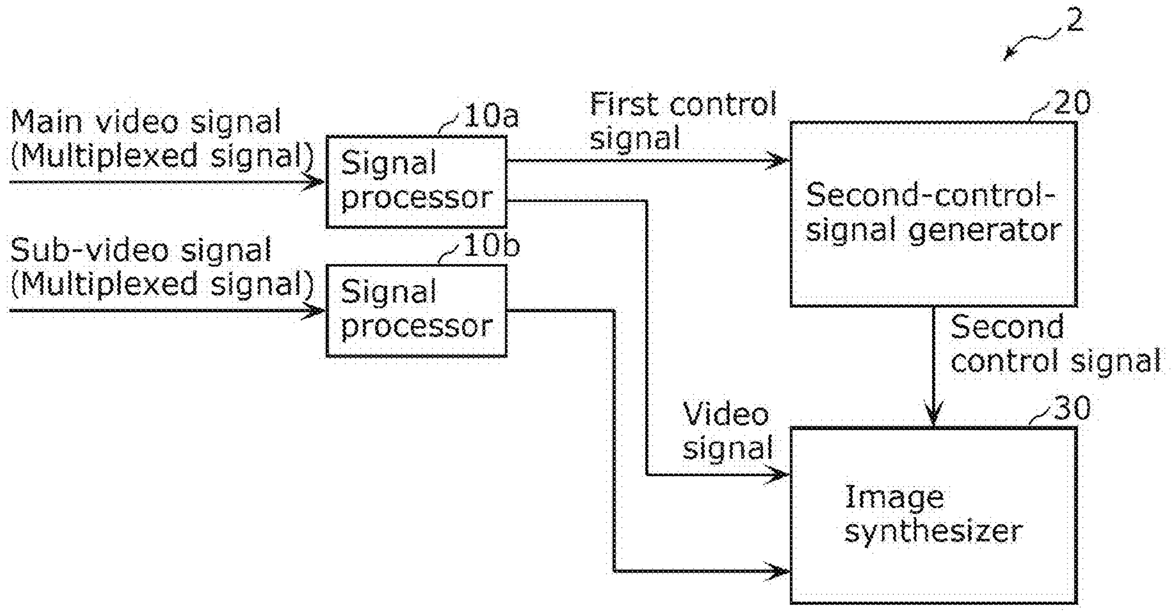
FIG. 10 is a block diagram illustrating a configuration example of an image processing device according to Embodiment 2.

FIG. 10 is a block diagram illustrating a configuration example of image processing device 2 according to Embodiment 2.

In Embodiment 2, each of a plurality of video signals processed by a plurality of signal processors is a multiplexed signal obtained by multiplexing a plurality of (two or more) video signals with different sensitivities selected when pixels are output. Hereinafter, a configuration example regarding a circuit that synthesizes images through signal processing for multiplexed signals is described in detail.

As illustrated in FIG. 10, image processing device 2 includes a plurality of signal processors (signal processors 10*a* and 10*b* in Embodiment 2), second-control-signal generator 20, and image synthesizer 30. Here, second-control-signal generator 20 generates the second control signal in accordance with the first control signal generated by signal processor 10*a*. Image synthesizer 30 synthesizes the images that have undergone signal processing, in accordance with synthesis coefficients indicated by the second control signal. It should be noted that a defect correction circuit is not disposed in any of the plurality of signal processors. The functions of second-control-signal generator 20 and image synthesizer 30 are essentially the same as those described in Embodiment 1. Thus, explanations are omitted.

The constituent elements of image processing device 2 can be achieved as, for example, a processor that executes a program stored in memory.

The plurality of signal processors (signal processors 10*a* and 10*b* in Embodiment 2) perform signal processing on a plurality of video signals (a main video signal and a sub-video signal which are multiplexed signals, in Embodiment 2). As illustrated in FIG. 10, signal processor 10*a* is provided for the main video signal, and signal processor 10*b* is provided for the sub-video signal. Here, details of signal processor 10*a* are described with reference to FIG. 11.

Figure 11:
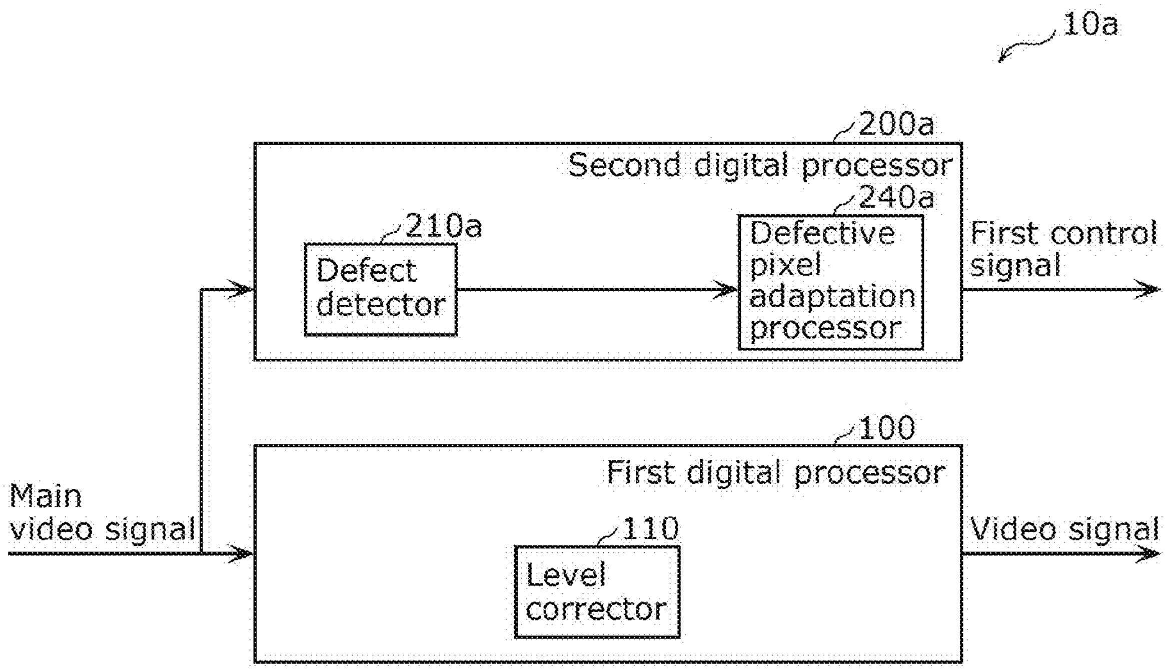
FIG. 11 illustrates a configuration example of a signal processor according to Embodiment 2.

FIG. 11 illustrates a configuration example of signal processor 10*a* according to Embodiment 2.

As illustrated in FIG. 11, signal processor 10*a* includes first digital processor 100 for performing image adjustment and second digital processor 200*a*. First digital processor 100 aims to process a video signal in order to synthesize video signals, whereas second digital processor 200*a* aims to perform processing for controlling a synthesis condition. The function of first digital processor 100 is essentially the same as that of first digital processor 100 described in Embodiment 1. Thus, explanations are omitted.

Second digital processor 200*a* includes defect detector 210*a* that detects a defective pixel and defective pixel adaptation processor 240*a* that performs adaptation processing. Second digital processor 200*a* performs, using defective pixel adaptation processor 240*a*, the adaptation processing in accordance with the result of defective pixel detection by defect detector 210*a*, and outputs the first control signal as the result of the adaptation processing to second-control-signal generator 20.

It should be noted that signal processor 10*b* includes first digital processor 100 and does not include second digital processor 200*a*. That is, signal processor 10*b* has only the function of adjusting the level of a video signal.

Then, multiplexed video signals are described with reference to FIG. 12.

Figure 12:
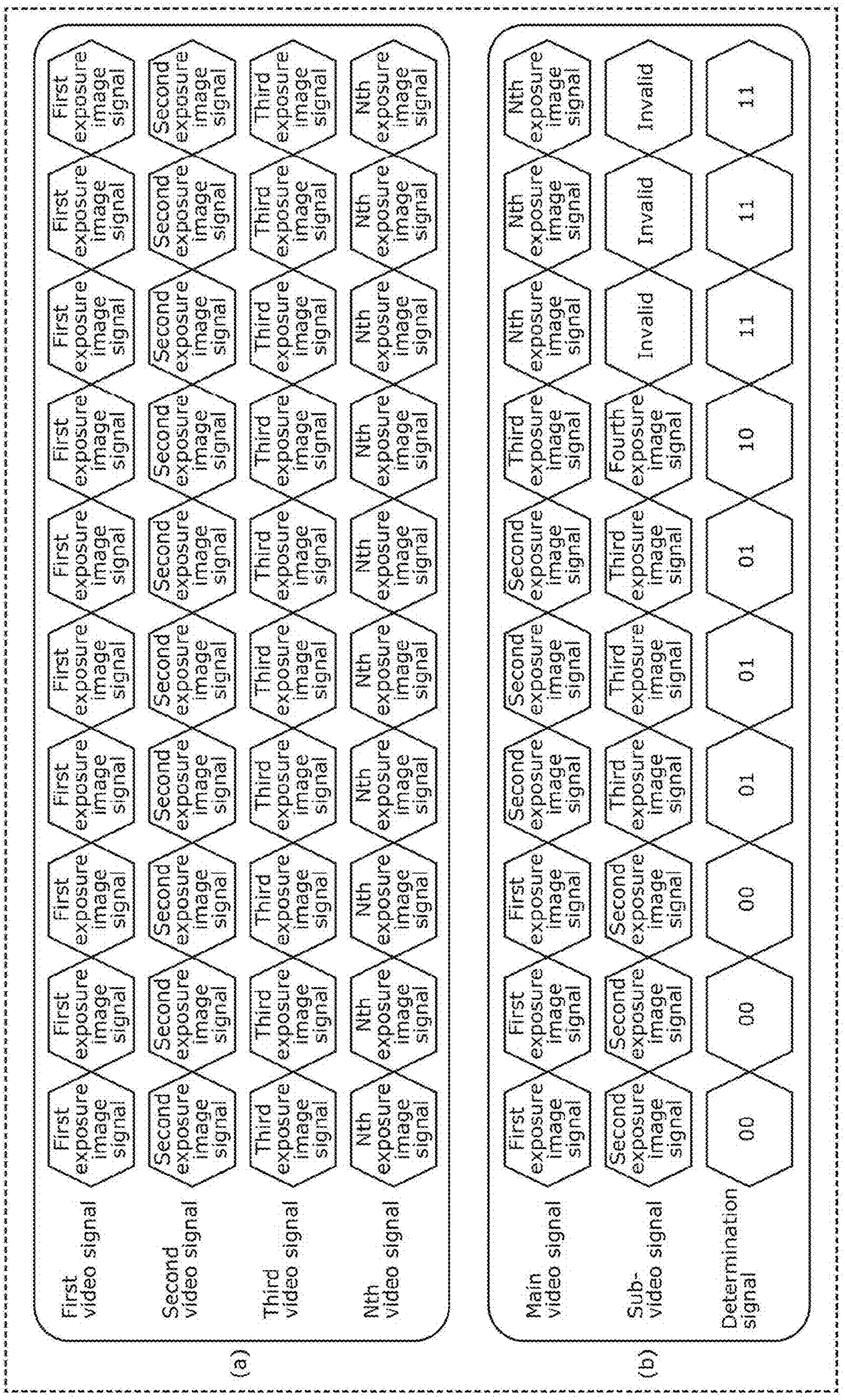
FIG. 12 illustrates the video signals of frames and multiplexed video signals.

FIG. 12 illustrates the video signals of frames and multiplexed video signals. (a) in FIG. 12 illustrates the video signals of frames, and (b) in FIG. 12 illustrates multiplexed video signals.

The multiplexed video signals each obtained by multiplexing video signals with different sensitivities selected when images are read out as illustrated in (b) in FIG. 12 include a multiplexed main video signal and a multiplexed sub-video signal each obtained by multiplexing one exposure image signal selected during the readout of each pixel from among the first to nth video signals as illustrated in (a) in FIG. 12, and a determination signal indicating, for each pixel, which signal is selected.

The main video signal is a multiplexed signal obtained by multiplexing at least the first video signal and the second video signal with a sensitivity lower than that of the first video signal. The sub-video signal is a signal to be synthesized with the main video signal. For instance, when the main video signal is the first video signal, the sub-video signal is the second video signal with a sensitivity lower than that of the first video signal. For instance, when the main video signal is the second video signal, the sub-video signal to be synthesized is the third video signal with a sensitivity lower than that of the second video signal. For instance, when the main video signal is the nth video signal, since there is no signal to be synthesized, the sub-video signal is invalid data.

Here, explanations are given with respect to processing using two 10-bit video signals with a sensitivity ratio of 4 to 1, the first video signal and the second video signal.

Figure 13:
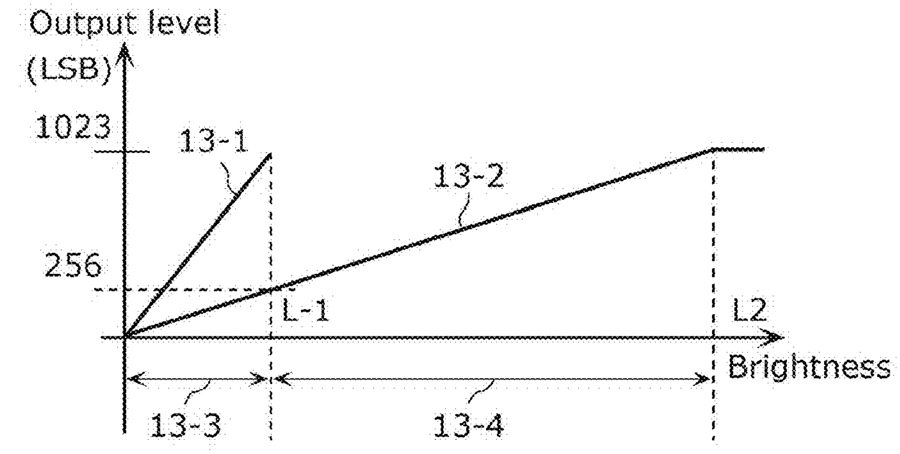
FIG. 13 illustrates the multiplexed first video signal and second video signal according to Embodiment 2.

FIG. 13 illustrates the multiplexed first video signal and second video signal according to Embodiment 2. The output characteristics of the first video signal are indicated by 13-1, and the output characteristics of the second video signal are indicated by 13-2.

Figure 14:
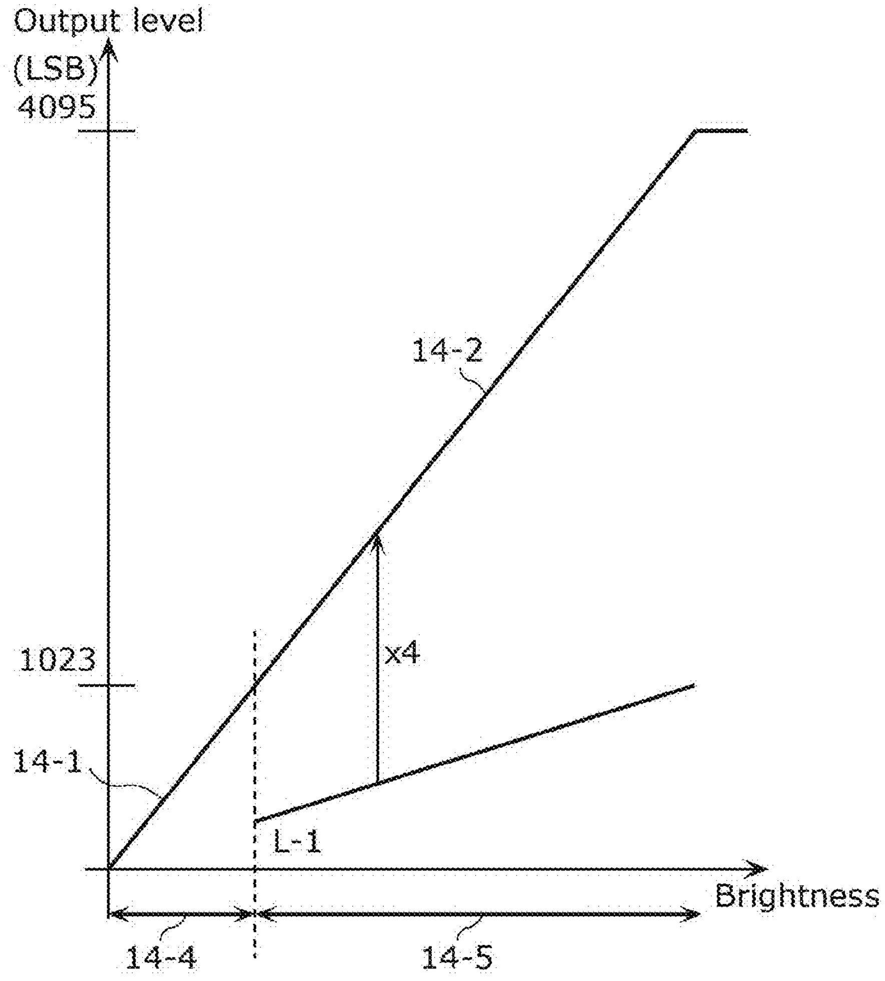
FIG. 14 illustrates a relationship between the multiplexed first video signal and second video signal according to Embodiment 2.

FIG. 14 illustrates a relationship between the multiplexed first video signal and second video signal according to Embodiment 2. The output characteristics of the first video signal are indicated by 14-1, and the output characteristics of the quadrupled second video signal are indicated by 14-2.

Using first digital processor 100, signal processor 10*a* that performs signal processing on the multiplexed main video signal performs level correction in accordance with the determination signal (see (b) in FIG. 12) indicating, for each pixel, which signal is selected. The determination signal is an example of a signal indicating the states of the multiplexed signals. As illustrated in FIG. 13, the multiplexed main video signal up to a brightness of L-1 corresponds to the first video signal (13-1), and the multiplexed main video signal at a brightness of L-1 or brighter corresponds to the second video signal (13-2). Here, the signal level of the second video signal (13-2) is a quarter of that of the first video signal (13-1). The determination signal is a signal indicating which signal is selected. The determination signal in the range (13-3) where the first video signal (13-1) is selected indicates, for example, "00". The determination signal in the range (13-4) where the second video signal (13-2) is selected indicates, for example, "01". For instance, it is set as below: a onefold level adjustment is performed when the determination signal indicates "00", and a fourfold level adjustment is performed when the determination signal indicates "01". Thus, as illustrated in FIG. 14, in range 14-4 darker than a brightness of L-1, the first video signal (14-1) that can be displayed at 1023 LSB serves as the main video signal, and in range 14-5 with a brightness of L-1 or brighter, the second video signal (14-2) that has undergone the fourfold level adjustment serves as the main video signal, which makes it possible to obtain a video signal with a wide dynamic range.

At this time, switching to the second video signal occurs at the level at which the first video signal becomes saturated. If there is an error between the signal level of the first video signal and the signal level of the second video signal that has undergone the level correction, a difference in the signal level occurs. In addition, even if the signal level of the first video signal is equivalent to that of the second video signal that has undergone the level correction, the second video signal with the quadrupled signal level has a poor S/N. Thus, a difference in the S/N also occurs in a switching boundary portion. For this reason, an image tends to be an unnatural image.

Figure 15:
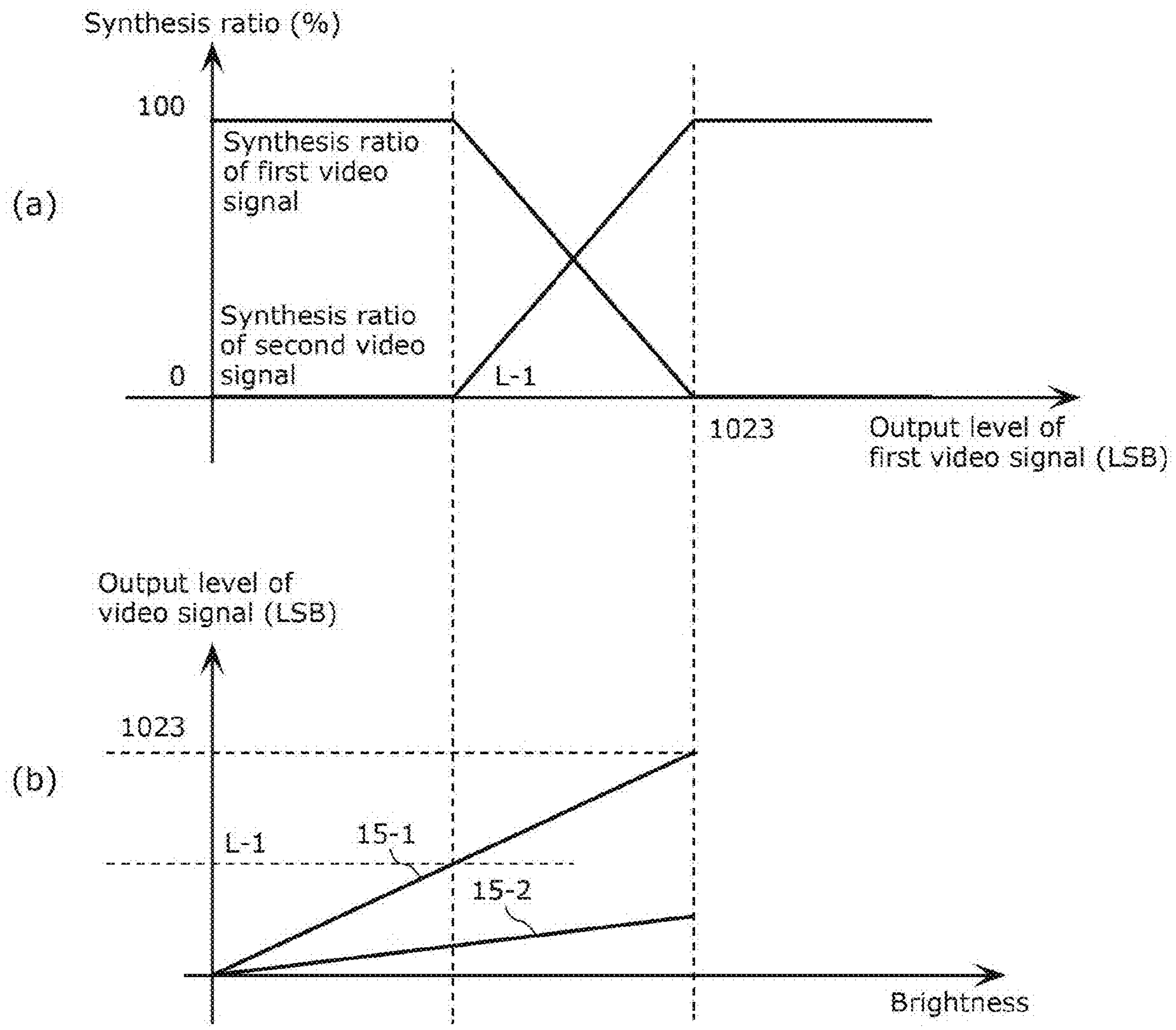
FIG. 15 is a figure for explaining synthesis coefficients according to Embodiment 2.

As illustrated in FIG. 15, a sub-video signal is used to reduce the unnaturalness due to a signal level difference and a S/N difference.

FIG. 15 is a figure for explaining synthesis coefficients according to Embodiment 2. (a) in FIG. 15 illustrates a synthesis ratio of the main video signal which is the first video signal to the sub-video signal which is the second video signal. (b) in FIG. illustrates relationships between the brightness and the signal level in the main video signal which is the first video signal and the sub-video signal which is the second video signal. The output characteristics of the main video signal are indicated by 15-1, and the output characteristics of the sub-video signal are indicated by 15-2.

As illustrated in (a) and (b) in FIG. 15, the synthesis ratio of the main video signal (15-1) to the sub-video signal (15-2) is gradually changed from a given signal level (for example, the level corresponding to a brightness of L-1) of the main video signal (15-1) which is the first video signal. Specifically, control is performed in which the synthesis ratio of the sub-video signal is gradually increased and the switching to the 100% sub-video signal occurs at 1023 LSB, which is the saturation signal level. The main video signal is switched to the second video signal at a signal level of 1024 LSB or higher. Thus, gradually changing the synthesis coefficients can flatten the amount of change in the signal level difference and the amount of change in the S/N difference, which can reduce the unnaturalness due to the differences.

When a defect occurs in the main video signal, since second-control-signal generator 20 cannot correctly perform level determination for calculating the synthesis coefficients illustrated in (a) in FIG. 15, it is not possible to correctly generate a synthesis condition (the second control signal). As a result, a degradation phenomenon in a synthesized image is generated. As image degradation phenomena, for example, a level change in the defect signal and expansion of a defect into the surrounding pixels are considered.

In Embodiment 2, second digital processor 200*a* detects a defective pixel and performs calculation of the adaptation processing for the defective pixel. Then, synthesis coefficients indicated by the second control signal generated by second-control-signal generator 20 are controlled in accordance with the result of the adaptation processing. In this way, even if a defect has occurred, image synthesis is performed without being affected by the defect. Even if a defect has occurred, a synthesized image is generated in which the defect remains the same and partial S/N degradation and the expansion of the defect into the surrounding pixels are suppressed. In this case, an optimal image can be generated by performing proper defect correction with the use of, for example, a defect correction circuit, which is a subsequent circuit. Operation of image processing device 2 is described below in detail.

Defect detector 210*a* performs defective pixel detection on the first video signal input into second digital processor 200*a*.

Figure 16:
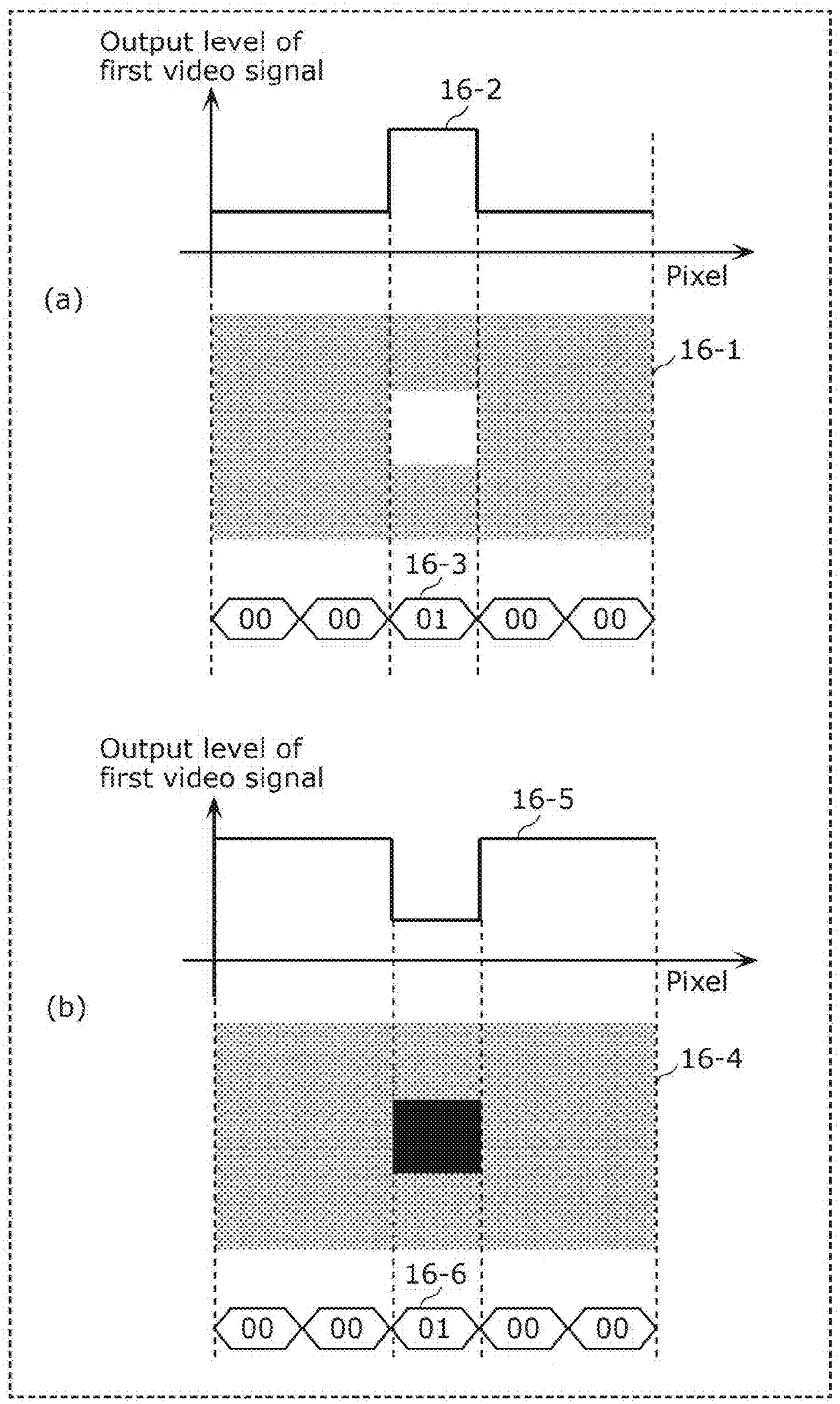
FIG. 16 illustrates relationships between a defective pixel, a video signal level, and a determination signal according to Embodiment 2.

FIG. 16 illustrates relationships between a defective pixel, the video signal level, and a determination signal according to Embodiment 2. (a) in FIG. 16 illustrates an instance of a white defect, and (b) in FIG. 16 illustrates an instance of a black defect.

A defect image including a white defect is an image with only the defective pixel appearing as blown-out highlights (clipped whites), as indicated by 16-1 in (a) in FIG. 16. A defect image including a black defect is an image with only the defective pixel appearing as blocked-up shadows (clipped blacks), as indicated by 16-4 in (b) in FIG. 16. A video signal has redundancy and the amount of change in contiguous data is small. Thus, if the video signal includes a defect, data tends to change to a great extent only with respect to one pixel.

Here, as the video signal, the signal level of the white defect is bright only with respect to one pixel as indicated by 16-2, and the black defect is represented as a portion of an image with only the one pixel being dark as indicated by 16-5.

The first video signal in the multiplexed main video signal has the following feature: as indicated by 16-3, the determination signal indicates "00" for the surrounding pixels, and only the defective pixel is represented as different signal "01". By using the feature, defect detector 210*a* detects a defective pixel.

Figure 17:
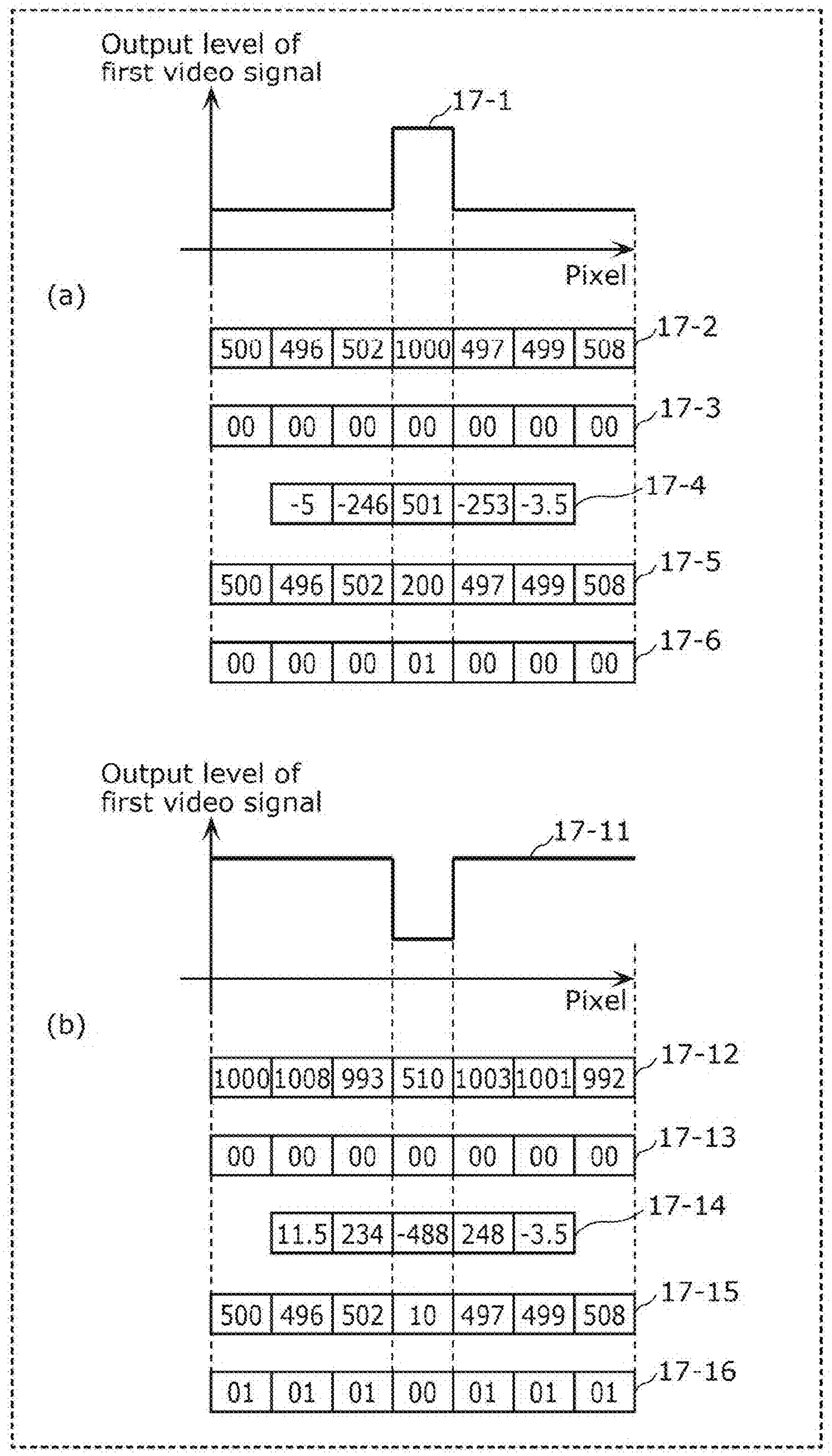
FIG. 17 is a figure for explaining defective pixel detection according to Embodiment 2.

FIG. 17 is a figure for explaining defective pixel detection according to Embodiment 2. (a) in FIG. 17 illustrates an instance of a white defect, and (b) in FIG. 17 illustrates an instance of a black defect.

An instance where a white defect as indicated by 17-1 in FIG. 17 has occurred is considered. In Embodiment 2, since the main video signal is a multiplexed signal, when, as indicated by 17-2, the level of a defect signal is less than 1024 LSB, which is the saturation level of the first video signal, the pixels are indicated by the same determination signal as indicated by 17-3. At this time, a defective pixel is detected by, for example, comparing the signal level of an attention pixel and the signal levels of its surrounding pixels. As indicated by 17-4, the difference is calculated as a large value only for the defective pixel. At this time, when the signal level of the difference for determining the pixel as a defective pixel is set to 60 LSB, if the difference (17-4) indicates 60 LSB or higher, the pixel can be determined as a defective pixel. For instance, the sensitivity ratio of the signal for "00" indicated by the determination signal to the signal for "01" indicated by the determination signal is 16 to 1. When the level of the defective pixel is higher than or equal to 1024 LSB, which is the saturation level of the first video signal, as indicated by 17-6, only the defective pixel is indicated by a different determination signal. In 17-5, the signal level of the attention pixel indicates "200". Although the signal level of the attention pixel when the determination signal indicates "00" is 1024 LSB or higher, the signal level of the attention pixel when the determination signal indicates "01" as indicated by 17-6 is one sixteenth the signal level when the determination signal indicates "00", which means that the signal is not saturated. At this time, defective pixel detection is performed by comparing the determination signal for the attention pixel and the determination signals for its surrounding pixels. If the determination signal for the attention pixel differs from the determination signals for its surrounding pixels, the attention pixel can be determined as a defective pixel.

With regard to a black defect as indicated by 17-11, a defective pixel can be detected by performing the processing performed on the white defect. As indicated by 17-12, when the signal levels of the surrounding pixels are less than 1024 LSB, which is the saturation level of the first video signal, the pixels are indicated by the same determination signal as indicated by 17-13. At this time, a defective pixel is detected by comparing the signal level of an attention pixel and the signal levels of its surrounding pixels. As indicated by 17-14, the difference is calculated as a large value in the negative direction only for the defective pixel. At this time, when the signal level of the difference for determining the pixel as a defective pixel is set to minus 60 LSB, if the difference (17-14) indicates minus 60 LSB or lower, the pixel can be determined as a defective pixel. For instance, the sensitivity ratio of the signal for "00" indicated by the determination signal to the signal for "01" indicated by the determination signal is 16 to 1. When the signal levels of the surrounding pixels are higher than or equal to 1024 LSB, which is the saturation level of the first video signal, as indicated by 17-16, only the defective pixel is indicated by the determination signal different from the determination signal of the surrounding pixels. In 17-15, the signal levels of the surrounding pixels indicate "500", "496", "502", "497", "499" and "508". When the determination signal indicates "00", the signal levels of the surrounding pixels are at least 1024 LSB, which is the saturation level. However, as indicated by 17-16, when the determination signal indicates "01", the signal levels of the surrounding pixels are one sixteenth the signal levels when the determination signal indicates "00", which means that the signals are not saturated. At this time, defective pixel detection is performed by comparing the determination signal for the attention pixel and the determination signals for its surrounding pixels. If the determination signal for the attention pixel differs from the determination signals for its surrounding pixels, the attention pixel can be determined as a defective pixel.

Then, defective pixel adaptation processor 240*a* is described.

Defective pixel adaptation processor 240*a* receives a defect signal including the defect detected by defect detector 210*a*. Normal processing using the main video signal and the sub-video signal is performed on a pixel determined not to be a defective pixel. Case classification and adaptation processing are performed on a pixel determined as a defective pixel. Here, the adaptation processing for the defective pixel is described with reference to FIG. 18.

Figure 18:
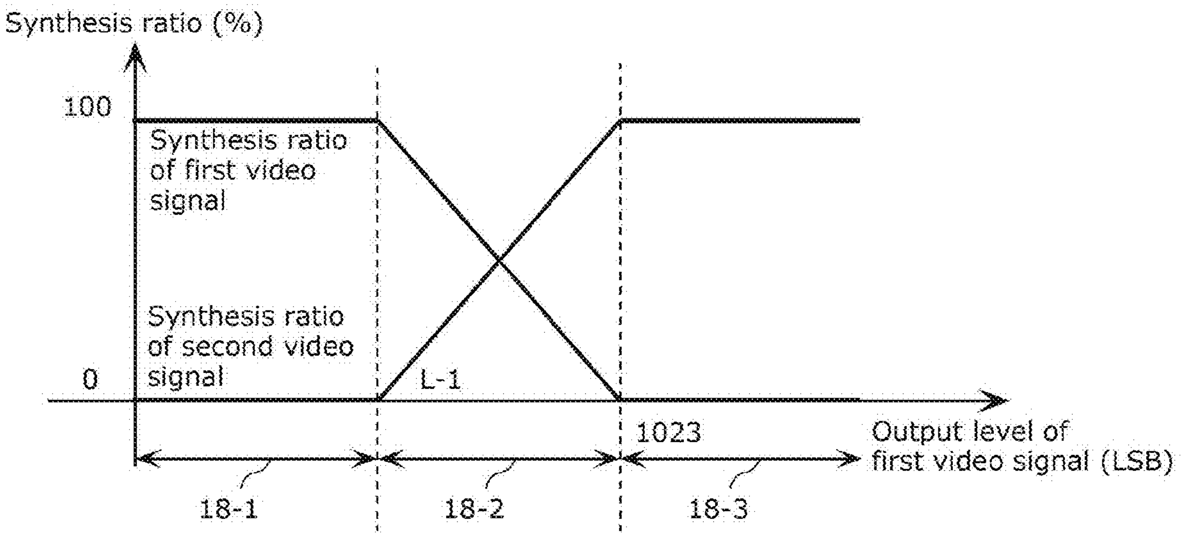
FIG. 18 is a figure for explaining defect adaptation control according to Embodiment 2.

FIG. 18 is a figure for explaining defect adaptation control according to Embodiment 2.

First, an instance where a white defect has occurred is considered. Here, since the result of image synthesis changes depending on the signal level of the defect, an explanation is given using synthesis coefficients for use in synthesizing the first video signal and the second video signal in FIG. 18.

Range 18-1 is a range where the usage percentage of the main video signal of the first video signal is 100%. Range 18-2 is a range where the main video signal of the first video signal multiplied by a synthesis coefficient and the sub-video signal of the second video signal multiplied by a synthesis coefficient are synthesized. Range 18-3 is a range where the usage percentage of the main video signal of the second video signal is 100%.

When a white defect has occurred in the main video signal of the first video signal and the signal level of the white defect is the saturation level, even if the main video signal is the video signal that would not have been saturated if the white defect had not occurred, the determination signal indicates a value corresponding to the main video signal of the second video signal due to the effects of the white defect. As a result, the video signal is determined as the second video signal. Thus, the state is falsely recognized as a state in which the usage percentage of the main video signal of the second video signal is expected to be 100% as indicated by 18-3. Accordingly, the second video signal will be used with a usage percentage of 100%. At this time, when the actual signal level of the video signal is a level corresponding to the brightness of range 18-1, the signal level of the second video signal is low, which means that the second video signal has a poor S/N. Thus, the signal with the poor S/N will be used with a usage percentage of 100%. Thus, a synthesized image with a partially poor S/N is generated by using the synthesized signal.

In addition, when the signal level of the white defect is at least the level corresponding to a brightness of L-1 illustrated in FIG. 18 and at most the saturation level illustrated in FIG. 18, the state is falsely recognized as a state in which the synthesis coefficients in range 18-2 are expected to be used. Thus, the defect signal of the main video signal and the sub-video signal are synthesized at a certain ratio. As a result, an image obtained through synthesis is a synthesized image using the defect signal multiplied by a certain synthesis coefficient. Thus, the signal level of the synthesized signal changes to the signal level affected by the defect, and a correct synthesized signal cannot be obtained.

To avoid synthesis based on the false recognition, when defect detector 210*a* detects a defective pixel, defect detector 210*a* transmits, to defective pixel adaptation processor 240*a*, a defect detection result (referred to as a first defect detection result) obtained by comparing the attention pixel and its surrounding pixels in the video signal or a defect detection result (referred to as a second defect detection result) based on the determination signal.

When receiving the first defect detection result, defective pixel adaptation processor 240*a* unconditionally changes the synthesis coefficients to the synthesis coefficients in range 18-1 in order to output the 100% main video signal. For the synthesis coefficients in range 18-1, the 100% main video signal is output in its original state. Thus, regardless of the signal level of the defect, synthesis is performed in a state in which the defect signal remains in its original form. When defective pixel adaptation processor 240*a* receives the second defect detection result, the main video signal does not include the first video signal. In this case, the first video signal is expected to be a 1023 LSB saturation signal due to the defect signal. Thus, the signal level is unconditionally replaced with 1023 LSB. By the signal level being replaced with 1023 LSB, the saturation signal with the signal level of the defect signal is output. Thus, the signals can be synthesized in a state in which the defect signal remains in its original form.

Next, an instance where a black defect has occurred is considered.

When a black defect of a level less than or equal to the level corresponding to a brightness of L-1 has occurred in the main video signal, even when the signal level of the video signal in which a black defect has not occurred is in any of ranges 18-1, 18-2, and 18-3, the state is determined as a state in which the synthesis coefficients in range 18-1 are expected to be used. In this case, as a result, the 100% first video signal is output in its original state, and the signal with the black defect is output in its original state. Thus, the signal level of the black defect will not change. However, if a black defect of a level higher than or equal to the level corresponding to a brightness of L-1 has occurred in the main video signal, the state is falsely recognized as a state in which the synthesis coefficients in range 18-2 are expected to be used. Thus, as in the case of the white defect, the defect signal of the main video signal and the second video signal are synthesized at a certain ratio. As a result, an image obtained through synthesis is a synthesized image using the defect signal multiplied by a certain synthesis coefficient. Thus, the signal level of the synthesized signal changes to the signal level affected by the defect, and a correct synthesized signal cannot be obtained.

To avoid synthesis based on the false recognition, as in the case of the white defect, upon detecting a defective pixel, defect detector 210*a* outputs, to defective pixel adaptation processor 240*a*, the first defect detection result obtained through comparison between the attention pixel and its surrounding pixels in the video signal or the second defect detection result based on the determination signal.

When the first defect detection result or the second defect detection result, whichever is input into defective pixel adaptation processor 240*a*, if defect detector 210*a* detects a defective pixel, defective pixel adaptation processor 240*a* unconditionally changes the synthesis coefficients to the synthesis coefficients in range 18-1. For the synthesis coefficients in range 18-1, the 100% main video signal is output in its original state. For a black defect, in the state in which the main video signal always includes the first video signal, it is possible to perform synthesis with the defect signal remaining in its original form regardless of the signal level of the defect.

In accordance with the result of defect detection in the main video signal, for both of the white defect and the black defect, defective pixel adaptation processor 240*a* unconditionally changes the synthesis coefficients to the synthesis coefficients in range 18-1 where the usage percentage of the first video signal is 100%. In addition, when a white defect is detected on the basis the determination signal, defective pixel adaptation processor 240*a* adaptively transmits the first control signal to second-control-signal generator 20 in order to fix the level of the main video signal to the saturation level 1023 LSB. When receiving the first control signal from defective pixel adaptation processor 240*a*, second-control-signal generator 20 generates the second control signal for changing the synthesis coefficients in order to fix the level of the main video signal to the saturation level 1023 LSB. Normally, second-control-signal generator 20 generates the synthesis ratio of the main video signal to the sub-video signal (the second control signal) as illustrated in FIG. 18 in accordance with the level of the first video signal. However, when receiving the first control signal specifying 100% as the synthesis coefficient of the first video signal from defective pixel adaptation processor 240*a*, second-control-signal generator 20 generates the second control signal for unconditionally changing the synthesis coefficient of the first video signal to 100%.

In this way, when a defective pixel is detected in the first video signal in the main video signal, defective pixel adaptation processor 240*a* of signal processor 10*a* that performs the signal processing on the main video signal generates the first control signal specifying, as the synthesis coefficient of the first video signal in the main video signal, a synthesis coefficient higher than the synthesis coefficient of the second video signal to second-control-signal generator 20. For instance, defective pixel adaptation processor 240*a* can mitigate the degradation of a synthesized image by generating the first control signal specifying 75% or higher as the synthesis coefficient of the first video signal. For instance, defective pixel adaptation processor 240*a* can sufficiently mitigate the degradation of a synthesized image by generating the first control signal specifying 90% or higher as the synthesis coefficient of the first video signal. For instance, defective pixel adaptation processor 240*a* can further mitigate the degradation of a synthesized image by generating the first control signal specifying 100% as the synthesis coefficient of the first video signal.

Second-control-signal generator 20 generates the second control signal in accordance with the synthesis coefficient specified by the first control signal generated in the processing by defective pixel adaptation processor 240*a*, and then outputs the generated second control signal to image synthesizer 30. Image synthesizer 30 can generate a synthesized signal that is not affected by the defect, by synthesizing, in accordance with the synthesis ratio indicated by the second control signal, the first video signal and the second video signal that has undergone the level adjustment. It should be noted that defect correction can be performed without any problems on the synthesized signal generated by image synthesizer 30 in the subsequent processing.

As described above, when processing is performed on a multiplexed signal obtained by multiplexing video signals with different sensitivities selected when pixels are output, the signals of frames are ununiform with regard to the multiplexed signal. Thus, the defect correction function does not work properly, and signal synthesis may be affected by the defect. By contrast, in Embodiment 2, it is possible provide image processing device 2 capable of dealing with a multiplexed signal obtained by multiplexing video signals with different sensitivities selected when pixels are output and capable of keeping the effects of the defect to a minimum.

Other Embodiments

Although the image processing devices according to one aspect or aspects of the present disclosure are described above on the basis of the embodiments, the present disclosure is not limited to the embodiments. The one aspect or the aspects of the present disclosure may include, within the scope of the present disclosure, embodiment(s) obtained by making various changes envisioned by those skilled in the art to each embodiment and embodiment(s) obtained by combining structural elements described in the different embodiments.

For instance, in the example described in Embodiment 1, second digital processor 200 includes defect remover 220 and low-pass filter 230. However, second digital processor 200 need not include defect remover 220 or low-pass filter 230.

For instance, the present disclosure can be achieved not only as an image processing device but also as an image processing method including steps (processes) performed by the constituent elements of the image processing device.

Figure 19:
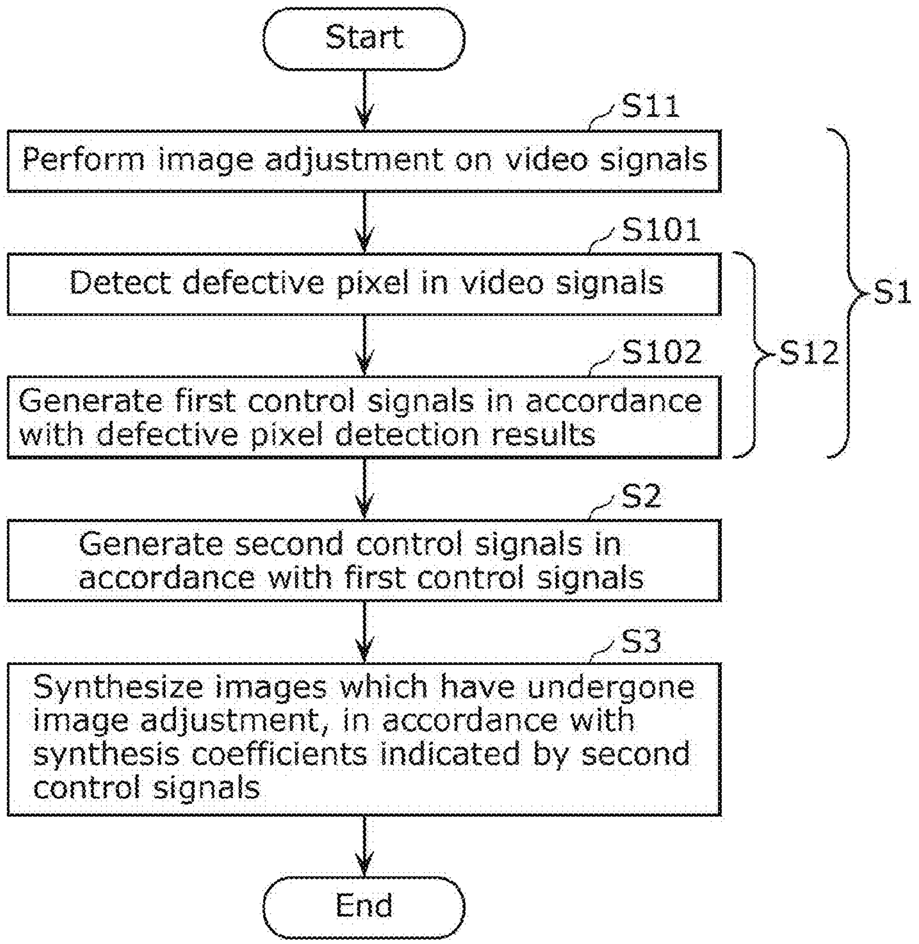
FIG. 19 is a flowchart illustrating an image processing method according to another embodiment.

FIG. 19 is a flowchart illustrating an image processing method according to another embodiment.

An image processing method is an image processing method performed by the image processing device. As illustrated in FIG. 19, the image processing method includes: performing signal processing on a plurality of video signals (step S1); generating second control signals in accordance with first control signals generated in the performing of the signal processing on the plurality of video signals (step S2); and synthesizing images (step S3). The performing of the signal processing on the plurality of video signals includes performing first digital processing for image adjustment (step S11) and performing second digital processing (step S12). The performing of the second digital processing includes detecting a defective pixel in each of the plurality of video signals (step S101) and generating, in accordance with the results of defective pixel detection, the first control signals specifying synthesis coefficients to be used in the generating of the second control signals (step S102). In the synthesizing, the images that have undergone the image adjustment in the performing of the first digital processing included in the performing of the signal processing on the plurality of video signals are synthesized in accordance with synthesis coefficients indicated by the second control signals, the synthesis coefficients being the synthesis coefficients specified by the first control signals. In the generating of the first control signals, when a defective pixel is detected, the first control signal specifying a synthesis coefficient for enabling the plurality of images to include an image in which the defective pixel remains is generated, the synthesis coefficient being used in the generating of the second control signals.

For instance, the present disclosure can be achieved as a program for causing a processor to execute the steps included in the image processing method. Furthermore, the present disclosure can be achieved as a non-transitory computer-readable recording medium, such as a CD-ROM, storing the program.

For instance, when the present disclosure is achieved as a program (software), the steps are performed by executing the program with the use of hardware resources such as the CPU, memory, and input/output circuit of a computer. That is, the steps are performed by the CPU obtaining data from, for example, the memory or the input/output circuit, performing calculation, and outputting the result of the calculation to, for example, the memory or the input/output circuit.

It should be noted that in the above embodiments, the constituent elements included in the image processing devices may be configured as dedicated hardware or may be achieved by executing a software program suitable for each constituent element. Each constituent element may be achieved by a program executer, such as a CPU or a processor, reading out and executing the software program stored in a recording medium, such as a hard disk or semiconductor memory.

A part or all of the functions of the image processing devices according to the above embodiments are achieved as an LSI, which is typically an integrated circuit. These functions may be individually included in one chip, or a part or all of the functions may be included in one chip. In addition, circuit integration is not limited to an LSI, and may be achieved using a dedicated circuit or a general-purpose processor. A field programmable gate array (FPGA) that can be programmed after manufacturing of an LSI or a reconfigurable processor in which connection and settings of circuit cells within an LSI are reconfigurable may be used.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is suitable for an image processing device and an imaging apparatus or a range imaging apparatus using the image processing device as an imaging device. The present disclosure is suitable for, for example, video cameras, digital cameras, or ranging systems.

The invention claimed is:

1. An image processing device comprising:

a plurality of signal processors that perform signal processing on a plurality of video signals;

a second-control-signal generator that generates second control signals in accordance with first control signals generated by the plurality of signal processors; and an image synthesizer, wherein each of the plurality of signal processors includes a first digital processor for performing image adjustment and a second digital processor, the second digital processor includes:

a defect detector that detects a defective pixel; and a defective pixel adaptation processor that generates, in accordance with a result of defective pixel detection, the first control signal specifying a synthesis coefficient to the second-control-signal generator, in accordance with synthesis coefficients indicated by the second control signals, the image synthesizer synthesizes a plurality of images that have undergone the image adjustment by the first digital processors of the plurality of signal processors, the synthesis coefficients each being the synthesis coefficient specified by the first control signal, and when the defective pixel is detected, the defective pixel adaptation processor generates the first control signal specifying, to the second-control-signal generator, a synthesis coefficient for enabling the plurality of images to include an image in which the defective pixel remains.

2. The image processing device according to claim 1, wherein the plurality of video signals are video signals with different sensitivities.

3. The image processing device according to claim 2, wherein the second digital processor includes:

a defect remover that removes the defective pixel; and a low-pass filter that performs flattening processing on a corresponding one of the plurality of video signals from which the defective pixel has been removed, and with respect to a pixel in which a defect has not been detected, the defective pixel adaptation processor generates the first control signal by using the corresponding one of the plurality of video signals that has undergone the flattening processing performed after the removal of the defective pixel.

4. The image processing device according to claim 2, wherein the plurality of video signals include a first video signal and a second video signal with a sensitivity lower than a sensitivity of the first video signal, and when a defective pixel has been detected in the first video signal, the defective pixel adaptation processor of a signal processor that performs the signal processing on the first video signal among the plurality of signal processors generates the first control signal specifying, as a synthesis coefficient of the first video signal, a synthesis coefficient higher than a synthesis coefficient of the second video signal to the second-control-signal generator.

5. The image processing device according to claim 4, wherein when a defective pixel has not been detected in the first video signal and a signal level of the first video signal is at least a predetermined level and at most a saturation level, the defective pixel adaptation processor of the signal processor that performs the signal processing on the first video signal refers to a result of defective pixel detection in the second video signal, and when a defective pixel has been detected in the second video signal, the defective pixel adaptation processor generates the first control signal specifying, as the synthesis coefficient of the second video signal, a synthesis coefficient higher than the synthesis coefficient of the first video signal.

6. The image processing device according to claim 1, wherein each of the plurality of video signals is a multiplexed signal obtained by multiplexing video signals with different sensitivities selected when pixels are output, and the defect detector detects the defective pixel in accordance with a signal indicating a state of the multiplexed signal.

7. The image processing device according to claim 6, wherein the plurality of video signals include a main video signal and a sub-video signal, the main video signal is a multiplexed signal obtained by multiplexing at least a first video signal and a second video signal with a sensitivity lower than a sensitivity of the first video signal, when the main video signal is the first video signal, the sub-video signal is the second video signal with the sensitivity lower than the sensitivity of the first video signal, when a defective pixel has been detected in the first video signal in the main video signal, the defective pixel adaptation processor of a signal processor that performs the signal processing on the main video signal among the plurality of signal processors generates the first control signal specifying, as a synthesis coefficient of the first video signal in the main video signal, a synthesis coefficient higher than a synthesis coefficient of the second video signal to the second-control-signal generator.

8. An image processing method performed by an image processing device, the image processing method comprising:

performing signal processing on a plurality of video signals;

generating second control signals in accordance with first control signals generated in the performing of the signal processing on the plurality of video signals; and synthesizing images, wherein the performing of the signal processing on the plurality of video signals includes performing first digital processing for image adjustment and performing second digital processing, the performing of the second digital processing includes detecting a defective pixel in each of the plurality of video signals and generating, in accordance with results of defective pixel detection, the first control signals specifying synthesis coefficients to be used in the generating of the second control signals, in the synthesizing, the images that have undergone the image adjustment in the performing of the first digital processing included in the performing of the signal processing on the plurality of video signals are synthesized in accordance with synthesis coefficients indicated by the second control signals, the synthesis coefficients being the synthesis coefficients specified by the first control signals, and in the generating of the first control signals, when a defective pixel is detected, a first control signal specifying a synthesis coefficient for enabling the images to include an image in which the defective pixel remains is generated, the synthesis coefficient being used in the generating of the second control signals.

* * * * *